United States Patent
Rix et al.

(10) Patent No.: US 6,903,662 B2
(45) Date of Patent: Jun. 7, 2005

(54) COMPUTER INPUT DEVICE WITH INDIVIDUALLY POSITIONABLE AND PROGRAMMABLE INPUT MEMBERS

(75) Inventors: Scott M. Rix, Mountain View, CA (US); Larry J. Kelly, Los Altos, CA (US); Michael S. Roberts, San Francisco, CA (US); Preston D. Brown, San Francisco, CA (US); William L. Burling, Jr., Palo Alto, CA (US); Tim C. Kelly, Cupertino, CA (US); Scott W. Summit, San Francisco, CA (US)

(73) Assignee: Ergodex, Mountain View, CA (US)

( * ) Notice: Subject to any disclaimer, the term of this patent is extended or adjusted under 35 U.S.C. 154(b) by 168 days.

(21) Appl. No.: 10/246,762

(22) Filed: Sep. 19, 2002

(65) Prior Publication Data

US 2004/0056781 A1 Mar. 25, 2004

(51) Int. Cl.[7] .................. H03K 17/94; H03M 11/00
(52) U.S. Cl. .................. 341/22; 340/10.6; 400/492; 345/172; 341/20
(58) Field of Search .................. 341/20, 22, 26; 340/10.6, 572.5, 870.28; 400/492; 345/168, 172

(56) References Cited

U.S. PATENT DOCUMENTS

| | | | |
|---|---|---|---|
| 3,623,016 A | 11/1971 | Winkler | |
| 4,602,138 A | 7/1986 | Berutto et al. | |
| 4,779,079 A | 10/1988 | Hauck | |
| 4,906,117 A | 3/1990 | Birdwell | |
| 5,144,302 A | 9/1992 | Carter et al. | |
| 5,259,626 A | 11/1993 | Ho | |
| 5,396,267 A | 3/1995 | Bouton | |
| 5,410,333 A | 4/1995 | Conway | |
| 5,438,331 A | 8/1995 | Gilligan et al. | |
| 5,539,775 A | 7/1996 | Tuttle et al. | |
| 5,572,226 A | 11/1996 | Tuttle | |
| 5,579,002 A | 11/1996 | Iggulden et al. | |
| 5,621,316 A | 4/1997 | Dames et al. | |
| 5,734,376 A | 3/1998 | Hsien | |
| 5,743,666 A | 4/1998 | VanZeeland et al. | |
| 5,838,307 A | 11/1998 | Bouton | |
| 5,842,118 A | 11/1998 | Wood, Jr. | |
| 5,854,945 A | 12/1998 | Criscito et al. | |
| 5,870,033 A | 2/1999 | Strolo | |
| 5,896,125 A | 4/1999 | Niedzwiecki | |

(Continued)

OTHER PUBLICATIONS

IBM Tech. Disclosure Bulletin, vol. 32, No. 10A, Mar. 1990, pp. 82–84.

Microchip, microID 13.56 MHz RFID, System Design Guide, 2001, entire document.

ISO/IEC Final Committee Draft 15693–1, pp. 2–7; Annexes A, B, C, and D.

Moyer et al., Silicon Graphics, Inc., Dial and Button Box Installation Guide, Document No. 007–9008–060, 30 pages, copyright 1997 and Product Data Sheet.

Product review of Saitek PC Dash, Saitek Industries Limited, review date Nov. 22, 1997.

Extrasensory Computing, PC Magazine, Apr. 20, 1999, p. 30.

Primary Examiner—Timothy Edwards
(74) Attorney, Agent, or Firm—Venable LLP; Eric J. Franklin

(57) ABSTRACT

A configurable computer input device. A base is operable to generate and detect a radio frequency carrier signal. A plurality independently positionable input members are each operatively positioned in the vicinity of the base and individually operable to modulate the carrier signal responsive to its identity and status.

48 Claims, 18 Drawing Sheets

U.S. PATENT DOCUMENTS

| | | |
|---|---|---|
| 5,920,308 A | 7/1999 | Kim |
| 5,929,760 A | 7/1999 | Monahan |
| 5,949,335 A | 9/1999 | Maynard |
| 5,995,048 A | 11/1999 | Smithgall et al. |
| 6,069,564 A | 5/2000 | Hatano et al. |
| 6,097,301 A | 8/2000 | Tuttle |
| 6,097,347 A | 8/2000 | Duan et al. |
| 6,133,833 A | 10/2000 | Sidlauskas et al. |
| 6,166,706 A | 12/2000 | Gallagher, III et al. |
| 6,172,609 B1 | 1/2001 | Lu et al. |
| 6,184,841 B1 | 2/2001 | Shober et al. |
| 6,236,315 B1 | 5/2001 | Helms et al. |
| 6,278,369 B2 | 8/2001 | Smith et al. |
| 6,285,295 B1 | 9/2001 | Casden |
| 6,285,342 B1 | 9/2001 | Brady et al. |
| 6,331,145 B1 | 12/2001 | Sity et al. |
| 6,340,116 B1 | 1/2002 | Cecil et al. |
| 6,351,215 B2 | 2/2002 | Rodgers et al. |
| 6,381,418 B1 | 4/2002 | Spurr et al. |

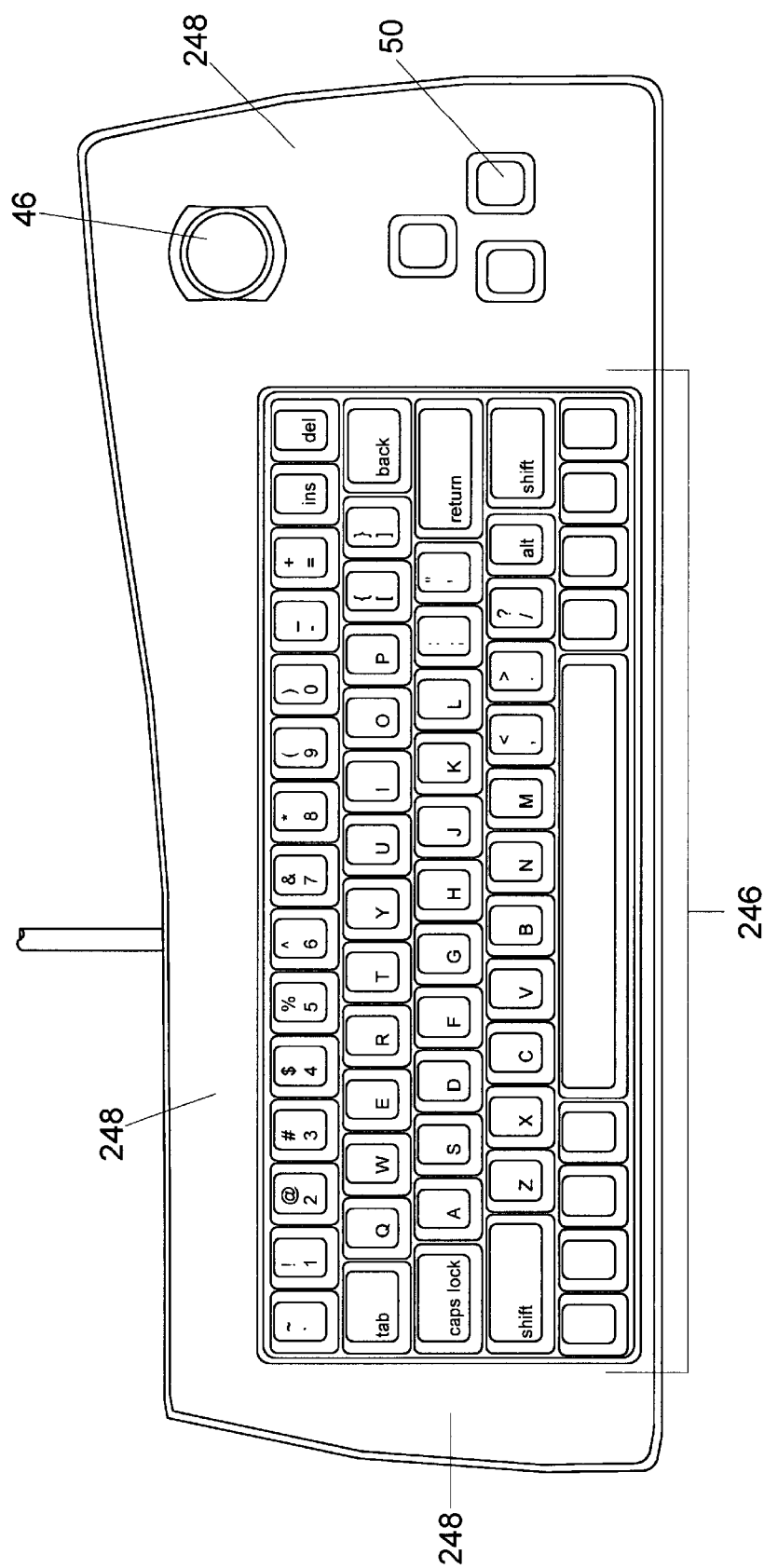

COMPUTER INPUT DEVICE WITH INDIVIDUALLY POSITIONABLE AND PROGRAMMABLE INPUT MEMBERS

FIELD OF THE INVENTION

The present invention relates to computer input devices. In particular, the present invention relates to a computer input device that includes independently positionable and programmable input members.

BACKGROUND OF THE INVENTION

Traditional computer input devices rely on tactile mechanisms to convey the intentions of the user to the host computer. Some common computer input devices include keyboards, buttons, mice, joysticks, dials, and trackballs.

Development of computer input devices has stagnated. The last input device to be widely adopted is the mouse, which was invented nearly forty years ago. Advancements in computer input device technology have failed to keep up the pace with development in other aspects of computer technology.

Furthermore, as functionality of applications has increased, the shortcomings of existing computer input devices become more apparent. For example, it is often necessary to adjust an on-screen slider bar to perform functions, such as adjusting sound volume. Operating a slider with a mouse-controlled cursor on a computer screen can be difficult and imprecise.

Another problem with existing computer input devices is that once they are manufactured, the location, quantity, and function of the individual tactile mechanisms are fixed. Traditional computer keyboards are an example of this problem. Known keyboards do not provide users with the ability to reposition individual keys in a way that would be more comfortable, logical, or effective. Typically, the user is forced to learn and adapt to the particular layout of an input device to use it effectively.

SUMMARY OF THE INVENTION

The present invention provides a revolutionary new input device. Among the advantages of the present invention are that it can include a number of input members or mechanisms. Along these lines, the present invention can include keys, buttons, button pads, key pads, thumb pads, joysticks, sliders, dials, trackpads, jog/shuttle wheels, and/or any other input member. The input members may be analog or digital. As a result, the present invention can replace cumbersome actuation of screen-based input with tactile user operated input members and, as a result, greatly facilitate accurate user input to applications.

Additionally, the present invention provides a computer input device that permits users to individually locate in desired positions a plurality of input members or mechanisms. Each input member may be individually programmed with one or more input functions. Among the advantages of the present invention is that any desired input members may be included in the device. The present invention permits a user to select an optimum mix, based upon type, number, position, orientation or any other parameter, of input members to use for specific tasks. Therefore, the present invention permits a user to create a custom input device with respect to the input members included and their arrangement.

When arranging the input members, a user may select, among other things, the position and orientation of each individual input member relative to the other input members as well as within the custom input device as a whole. For example, users can arrange the input members to conform to their unique hand geometry, increasing the comfort of using the input device. Alternately, users may arrange the input members into logical groupings according to function.

Significantly, as users, applications, user needs and/or other parameters change, the present invention can provide the ability to alter the positions of the input members. Also, input members may be added and/or subtracted from the input device. This further enhances the adaptability of the input device of the present invention.

Either before or after positioning of an input member, one or more input functions may be assigned to the input member. The function(s) may be selected based upon any criteria. Along these lines, function(s) may be assigned to optimize productivity or convenience. Similarly to the positioning of the input members, the function of the input members may be changed or reprogrammed.

Thus, the present invention can provide the ability to create an input device customized on a variety of levels. As such, the present invention provides a new computer input device with a functionality that is orders of magnitude beyond existing input devices.

As described herein, the present invention allows each user to specify the number, type, location, and function of each input mechanism, thereby offering the ability to create a personalized computer input device. The personalized interface may allow the user to place all the controls they need, but only the controls they use, and to place them in an arrangement that is logical, comfortable, and efficient for them. Furthermore, the present invention allows the user, at any time, to reconfigure the input device to add or remove features, as well as to adjust the device for other, very different, types of computer input functions, such as word processing or computer aided design (CAD). A graphical interface allows the input device to be configured to work the same across multiple software applications, or to perform a different task within each application.

The present invention provides a configurable computer input device. The device includes a base operable to generate and detect a radio frequency carrier signal. At least one independently positionable input member is operatively positioned in the vicinity of the base and is operable to modulate the carrier signal responsive to its identity and status. The device may include a plurality of independently positionable input member each operatively positioned in the vicinity of the base and each operable to modulate the carrier signal responsive to its identity and status.

Additionally, the present invention also includes a computer system. The computer system includes a host computer. The computer system also includes an input device including a base operable to generate and detect a radio frequency carrier signal. The base is operatively connected to the host computer. A plurality of independently positionable input members are each operatively positioned in the vicinity of the base and individually operable to modulate the carrier signal responsive to its identity and status.

BRIEF DESCRIPTION OF THE DRAWINGS

Objects and advantages of the present invention will be more clearly understood from the following specification when considered in conjunction with the accompanying drawings, in which:

FIG. 20 represents an overhead view of another embodiment of a computer input device according to the present invention.

DETAILED DESCRIPTION OF THE INVENTION

An embodiment of an input device according to the present invention includes a base. The base is operable to generate and detect a time-varying electromagnetic radio-frequency (RF) wave or carrier signal. At least one independently positionable input member is operatively positioned in the vicinity of the base and operable to modulate the carrier signal responsive to the identity and status of the input member.

An input device according to the present invention employs remotely-powered, passive, radio-frequency communication between the base and the input members. This type of system is well known and commonly used for Radio Frequency Identification (RFID) systems. A description of traditional RFID system design and operation may be found in "microID™ 13.56 MHz RFID System Design Guide" published by Microchip Technology, Inc.

Figure 9:
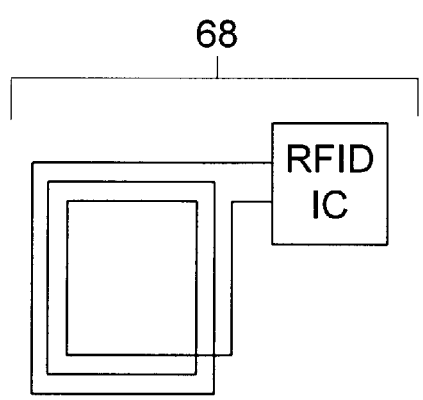
FIG. 9 represents an electrical schematic diagram of an RFID tag circuit.

As described below in greater detail, RFID tags may be employed in a number of elements of a device according to the present invention. The use and operation of RFID tags are well know in the prior art. Typically, the RFID tags used in the present invention employ a standard design of RFID circuits containing an antenna and RFID die and conform to the known ISO 15693 protocol described in the ISO/IEC Final Committee Draft 15693, the entire contents of the disclosure of which is hereby incorporated by reference. FIG. 9 illustrates an electronic schematic for a typical known RFID tag.

The present invention is not limited to use of the 15693 protocol. Any of the myriad other RFID tag designs and/or protocols may also be employed. Non-standard or custom communication protocols may also be employed. Furthermore, carrier frequencies other than 13.56 MHz may also be utilized.

Communication from the base to an input member is accomplished by modulation of the carrier signal. Communication from the input members to the base is accomplished through electromagnetic coupling with the carrier signal of the base, commonly referred to as backscatter modulation. Backscatter communication is also described in greater detail in the above-referenced publication by Microchip Technology, Inc. Briefly, in backscatter communication, an RF voltage link between the base and each input member may be comparable to weakly coupled transformer coils. Backscatter modulation is accomplished by momentarily shunting the antenna in the input member, inducing a voltage drop in the base antenna. This voltage drop may be subsequently amplified and detected by the base. By proper timing of this shunting, an input member may transmit data to the base.

Each input member is operatively positionable in the vicinity of the base. The term "operatively positionable" is intended to indicate that the input members are positioned at locations where they can modulate the carrier signal. This may include vertical and/or horizontal distance, orientation and/or other parameters. The distance between the input members and the base may depend upon a number of factors. For example, the strength of the carrier signal can affect the distance between the input members and the base; a stronger carrier signal could permit the distance to be greater. Also, whether the input members are inductively powered by the carrier signal or include a power source can affect the distance. Another factor that can affect the distance is the sensitivity of the receiving electronics in the base. Furthermore, the ambient environment in which the base is operating, which may include factors such as the presence of metal and/or electromagnetic noise sources, may also limit the operable distance of the input members. As long as the carrier signal has sufficient strength when it reaches an input member and the input member can modulate the carrier signal in a manner that is detectable by the base, then the input member may be considered to be operatively positioned in the vicinity of the base.

By utilizing backscatter communication, the input members do not require extra circuitry to generate and transmit a separate RF signal, such as a radio signal generator and a transmission antenna. This represents an improvement over known computer input devices. By relying on backscatter to send information from the input members to the base, the input members do not become intentional radiators of RF energy. Therefore, the input members do not require shielding to prevent unintentional electromagnetic interference or to satisfy Federal Communications Commission (FCC) regulations. The use of passive RF communication eliminates the difficulty with providing individual transmitters on each device. Backscatter communication from the input member to the base can also predictably limit the range of the input members, thereby preventing interference with other devices. Notwithstanding the above, if desired, the input members may each include a transmitter.

The carrier signal not only can serve to permit communication between the base and the input members, but it can also power the input members by inductive coupling to the base unit. Each input member may include one or more antennas to intersect the carrier signal generated by the base. Interaction between the carrier signal and the antenna(s) in the input member(s) can induce an AC voltage in the antenna(s). This AC voltage may be rectified to produce a DC voltage that may provide power to electronics within each input member. Alternatively or additionally, the input members may receive power from other means. Internal or external power sources for input members may include, but are not limited to: batteries, capacitors, and/or wired power. Input members for some embodiments may also receive power by converting mechanical energy, provided by the user while actuating the member, into electrical energy.

Figure 1:
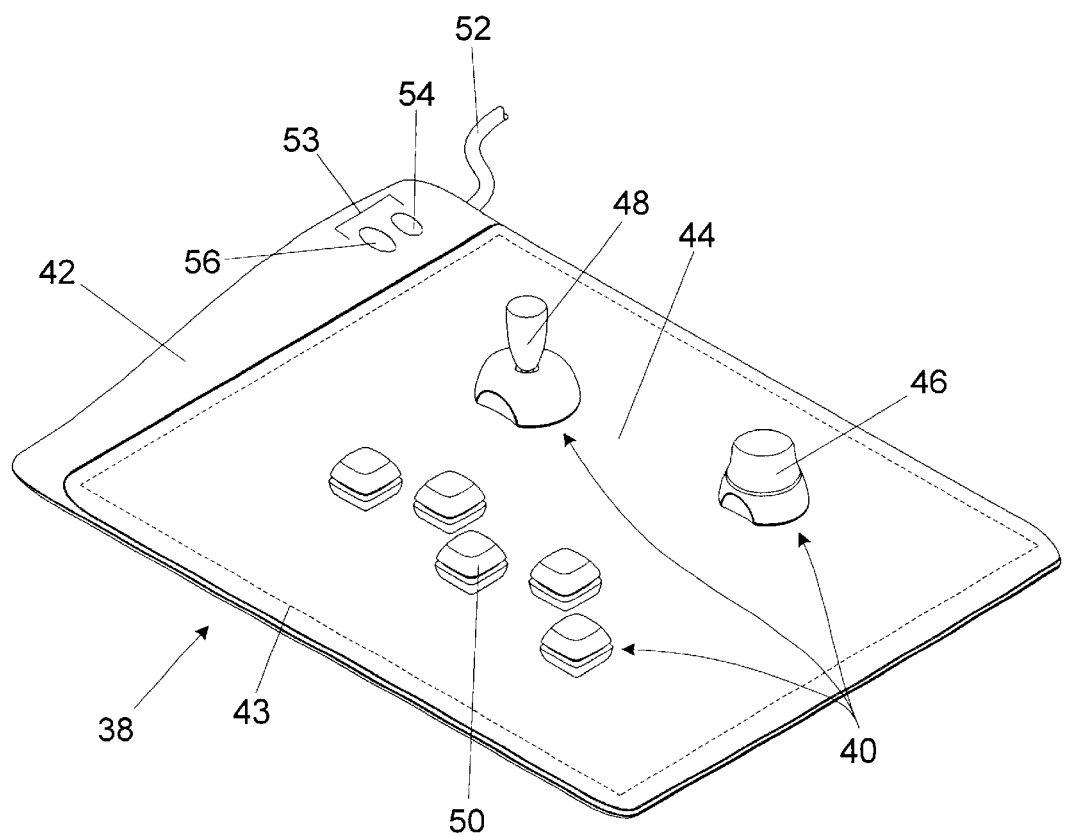
FIG. 1 represents a perspective view of an embodiment of a computer input device according to the present invention.

FIG. 1 illustrates an embodiment of a computer input device 38 according to the present invention. The device includes a base 42. The base typically includes an active area, or communication area 43 in the vicinity of which a variety of input members 40 may be arranged. The base may also include an area where input members typically are not arranged. This area may be an inactive area and/or may include elements other than input members. The embodiment shown in FIG. 1 includes an inactive region in the portion of the base that does not include communication area 43.

The base can have any desired shape and size. In some cases, the base may be small where, for example, desktop space is limited and/or where a large number of input members is not necessarily required. In other cases, the base may be large, where, for example, a large number of input members is desired and/or greater flexibility for arranging input members is desired.

The base typically includes a surface, such as communication surface 44 The communication surface 44 typically provides a surface within the communication area 43 onto which input members may be attached or arranged to carry out the wireless communications described above. The communication surface may have any desired shape, size and/or contour. While the communication surface typically is planar, some embodiments may include a communication surface that is contoured or is contourable. This could facilitate convenient placement of input members.

The base may be made of any suitable material that permits it to function. Typically, the base includes a housing made of molded plastic. This can facilitate removal and repositioning of the input members as described below in greater detail.

According to some embodiments, the base could have the shape of a video game controller. This would permit placement of game control input members in desired locations. In other embodiments, the base is incorporated into an existing computer input device, such as a keyboard. FIG. 20 illustrates such an embodiment. The embodiment shown in FIG. 20 includes a combined communication surface and fixed keyboard 246. The communication surface 248 in this embodiment surrounds the fixed keyboard. One advantage of such an embodiment is that it combines the keyboard and a device according to the present invention in a single housing, decreasing the amount of desk space necessary for the device. Combining the housing and processors of the two separate devices into a single device can also allow for lower component and manufacturing costs. Also, such an embodiment provides the standardization of a typical keyboard with the flexibility and customization capabilities of the present invention. Examples of other embodiments include a communication surface incorporated into a pen-tablet, a wireless tablet PC, the surface of a desk, a monitor housing or a laptop computer. In fact, the base/communication surface could be incorporated practically anywhere.

One or more input members are independently operatively positionable in the vicinity of the base to permit two-way communication between the input members and the base. In some embodiments, the input members may be directly attached to the base. According to other embodiments, the base may include a cover to which the input members are attached. The cover may cover the communication surface of the base. Alternatively, the cover may cover more or less area of the base. According to one embodiment, the cover covers the entire communication surface of the base. The cover may be made of any suitable material. Typically, the cover is made of molded plastic. This can facilitate removably positioning of the input members on the base, as described in greater detail below.

A cover may or may not be secured to the base. If the cover is secured to the base, the base and/or the cover may include one or more elements operable to secure the cover. For example, the cover and/or the base may include frictional retaining members. For example, the cover could extend on the sides of the base and the base and/or the cover could include protrusions that engage the other of the cover and the base. The base and/or the cover could include retaining members that could engage the other of the base and/or the cover and/or protrusions on the other of the base and/or the cover. Additionally, the cover and/or the base could include detents that receive the protrusions. The cover would be securely attached to the base with a friction fit, such that the user may "snap" it into place. According to another embodiment, the cover and/or the base could include one or more grooves and that engage one or more protrusions on the other of the base and the cover. The cover could be secured to the based by sliding the protrusion(s) in the groove(s). The cover could also be secured to the base with temporary or permanent adhesive. The cover may also be permanently secured to the base.

A cover can permit a user to easily change input configurations without repositioning input members. For example, a user may have different layouts for video editing and word processing. Instead of repositioning input members each time the user switches tasks, the user may simply keep the input members for video editing on one cover, and input members for word processing on another cover. The user would then merely swap one cover for another to reconfigure the device.

Any cover utilized with the present invention permits the base and input mechanisms to communicate with each other when the cover is in place. If the input members are powered by the carrier signal, the cover also permits this to take place. The cover may be made of any suitable material and have any suitable thickness that permits the communication and possible powering to take place. For example, the cover may be constructed of transparent molded plastic. Using a transparent cover allows a template, described below in greater detail, to be positioned between the cover and the base.

The present invention may also include one or more templates that permit, for example, input member functions and positions to be labeled. Templates may be employed whether or not the device includes a cover. The template typically is removable from the device.

If the device includes a cover and a template, typically the cover will be made of a transparent material such that the template may be arranged between the base and the cover. A template could be arranged prior to arranging the cover. Alternatively, a space, such as a slot could exist between the cover and the base or be formed in the cover or the base to permit a template to be slid between the cover and the base.

Templates can permit a user to customize and modify the appearance of the base surface, by allowing different artwork to be displayed through the template. Employing a clear cover can permit a template arranged underneath the cover to be viewed. This can avoid the need for holes cut in the cover to receive input members.

A template can provide a surface for printing custom text or graphics. For example, a template may mark and record a desirable configuration of the location of input members. This may allow a user to recreate a configuration of input members by aligning them with the markings on the surface of the template. The template may also be used to change the appearance of the base by providing a surface for custom graphics, advertisements, or artwork.

A template according to the present invention may be made of any suitable material. For example, a template could be made of paper, laminated paper, and/or plastic. Alternately, a template may be created from a surface with "electronic ink" that would permit an image on the template to be created or updated electronically. Such an electronic ink is available from E Ink Corporation of Cambridge, Mass. Alternately, the base, template, and/or cover could include some other electronic display means, such as a liquid crystal display (LCD), over the communication surface to provide a dynamic labeling and display functionality.

A cover and/or a template may include one or more RFID tags. The tags can provide a means for communication between the base and the cover and/or template and a means for data storage and retrieval. Placing RFID tags in and/or on the covers and/or templates can permit the base to recognize a layout of input members on the cover and/or template. This can permit the base to adapt computer input accordingly. For example, many computer game players prefer to use a single control layout scheme for multiple games. Often, game controls are different between different games. Using a memory-enabled template can permit a user to easily specify a configuration the user wishes to employ. Alternately, a cover that has an embedded RFID tag could store data about any particular cover and/or template and input members that are attached to them.

RFID tag(s) associated with the cover and/or template can also provide a means to transfer configuration data from one base to another, simply by moving the cover or the template to a different base. Additionally, RFID tag(s) associated with a cover and/or a template can provide a means for software publishers to specify the actions of one or more input members by including with software materials a preprinted template or cover that includes one or more preprogrammed RFID tags. For example, a preprogrammed RFID tag can provide to the base data about how movement of a joystick should be interpreted by the software installed on a host computer.

Figure 2:
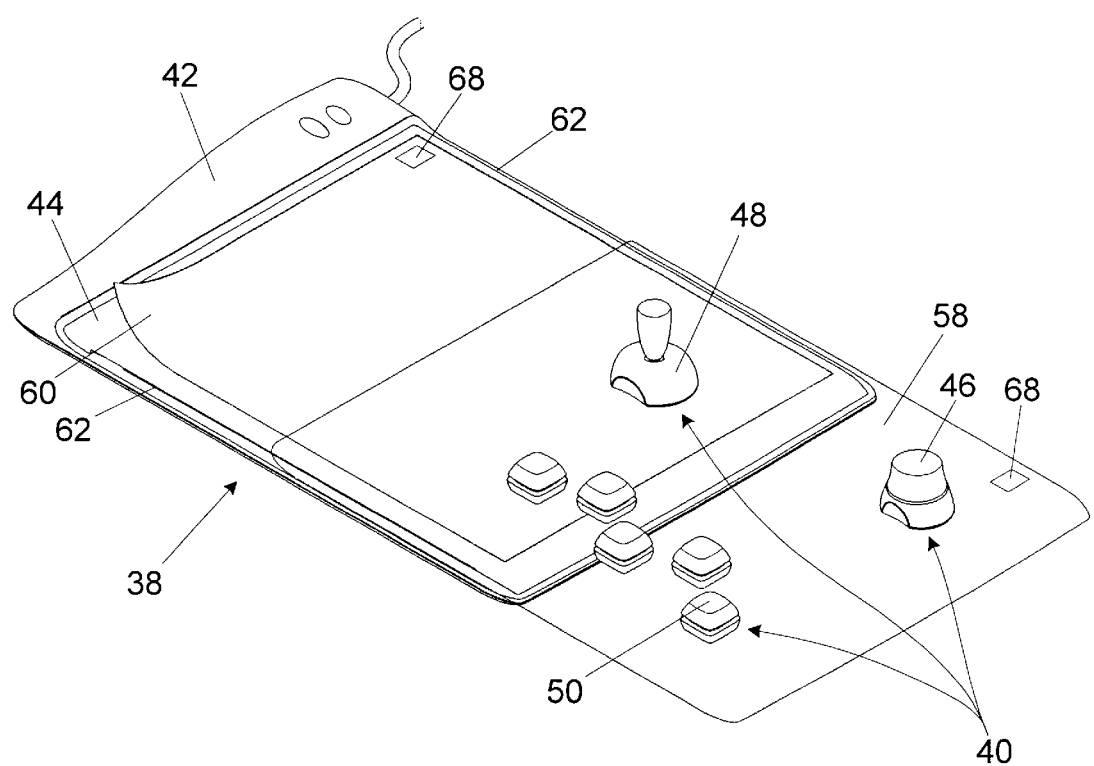
FIG. 2 represents a perspective view of another embodiment of a computer input device according to the present invention.

The embodiment shown in FIG. 2 includes an RFID circuit or RFID tag 68 in each of the cover and the template. The RFID tags 68 may be affixed to the surface, or embedded within, the template 60 and/or the cover 58. More than one RFID tag 68 may be used for the template 60 and/or the cover 58, to provide extra memory or additional functionality.

The embodiment shown in FIG. 2 includes a cover 58 attached to the base 42 by sliding it into cover guides 62 provided on the edges of the base 42. FIG. 2 shows the cover 58 partially attached to the base 42. In this embodiment, when the cover is fully attached it completely covers the communication surface 44. Typically, the cover 58 entirely overlaps the communication surface 44 of the base 42 and detents into a closed position. The cover 58, with any attached input mechanisms 40, may be completely removed from the base 42. By using different covers 58, a user may switch among multiple sets of input members 40. The cover 58 can permit a user to maintain two or more distinct configurations of input members 40, and to switch between the two configurations by switching covers 58 on the base 42. This feature prevents a user from being forced to reposition each input member 40 once the user has created a desirable configuration.

In other embodiments, the input members are not attached to either the base or a cover. In some cases, an input member may be placed on the base or a cover but not attached. Alternatively, an input member could be arranged elsewhere in the vicinity of the communication surface. An input member could be hand held and simply waved in the vicinity of the base to initiate communication. Attachment of input members to the base or a cover is discussed below in greater detail with respect to the input members.

The base may also include a processor operable to control the functioning of the base. Among other functions, the processor can coordinate the generation of the carrier signal through the base antenna. The processor may also coordinate the reception and analysis of the modulated carrier signal from input members, and communication with a host computer or other device. Arrangement and operation of the base antenna as well as its functioning with the input device is discussed below in greater detail. The base may include more than one processor to carry out one or more of the functions.

The base can include elements for initiating various functions, such as assigning one or more functions to actuation of an input member and activating a configuration program on a host computer or other device. For example, the embodiment of the base 42 shown in FIG. 1 includes a group of base buttons 53 to provide a means for a user to selecting the operational mode of the input device 38. These buttons include a configuration button 54 that can permit a user to launch a configuration program on a host computer 64, shown in FIG. 6. A record button 56 can permit a user to enter a record mode that records events generated by other traditional devices attached to the host computer 64, such as keypresses and mouse events. The base may include one or more elements for illuminating elements for initiating various functions. Along these lines, the base could include one or more light emitting diodes. The illumination state of the base LEDs (on or off) could be employed to signal the status of the recording and configuration mode or other functions of the input device.

To communicate with a host computer or other device, the base may include one or more communication elements. The communication elements could include one or more wired or wireless connections. Along these lines, the base could include a serial, parallel, universal serial bus (USB), Apple desktop bus (ADB), IEEE 13394 (fire wire), PC AT or PC XT keyboard or other connector. The embodiment shown in FIG. 1 includes a USB interface for communication between the base 42 and a host computer. A USB cable 52 connects the base and the host computer. Wireless communication elements could include elements to generate radio and/or infrared signals, such as IR ports or antennas for Bluetooth or IEEE 802.11.

A connection could rely on any suitable communication protocol. For example, where the connection includes a USB connection, the present invention could rely on the USB 1.1 protocol as defined by USB Implementers Forum, Inc. of Portland Oreg. However, one of ordinary skill in the art could modify the present invention without undue experimentation to use any of a multitude of standard or non-standard communication protocols, both wired and wireless, to provide communication between the base and a host computer or other device. A small sample of other possible protocols include the PC AT or PC XT keyboard standard, Apple Desktop Bus standard, parallel port standards, serial port standards, IEEE 1394, Bluetooth, and 802.11.

Figure 8:
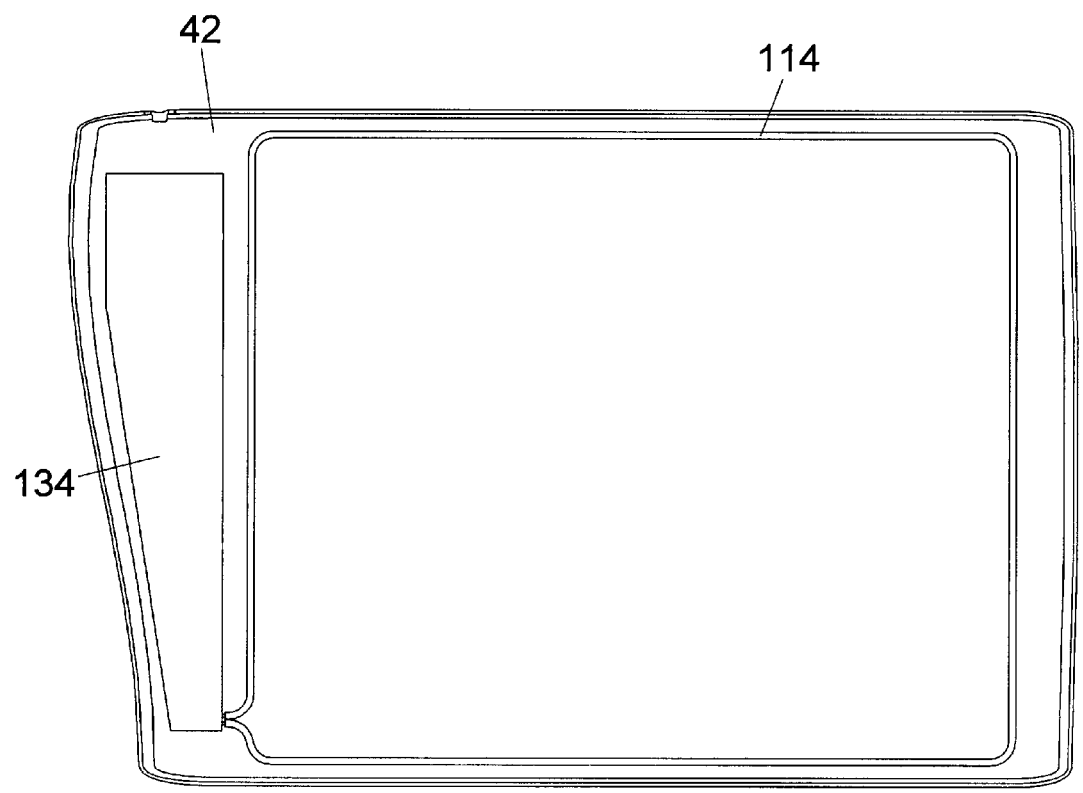
FIG. 8 represents a cut away view of an embodiment of a base portion of a computer input device according to the present invention.

FIG. 8 represents a cut away view of an embodiment of a base portion of base 42. In FIG. 8, the top housing layer of the base has been removed to show the positioning of the electronic assemblies in the present embodiment. The electronics for the base may be arranged on a base printed circuit board (PCB) 134 shown in FIG. 8. A USB cable 52 and a base antenna 114 may also be attached to the base PCB 134.

The base includes at least one antenna operable to generate the carrier signal as well as to receive the modulated signal from the input member(s). According to one embodiment of the present invention, a single loop antenna or magnetic dipole antenna may be used for this purpose. Multiple antennas may also be used for some embodiments. Many antenna designs known in the art are suitable for generating carrier waves for and communicating within RF communication systems. RFID system antenna design is described in greater detail in the above-referenced publication by Microchip Technology, Inc.

The base may also include two overlapping antennas to cover the entire surface area of the base. By using multiple antennas, the base may be able to cover more area, while minimizing the distance from an antenna trace in the base to the antennas in the input members. With two antennas, the base may switch between the antennas to determine the status of the input mechanisms positioned within the vicinity of the base. In some cases, the functions of generating the carrier signal and receiving the modulated signal from the may be carried out by separate antennas.

FIG. 8 illustrates the antenna arrangement in the embodiment of the base shown in FIG. 1 The base antenna 114 shown in FIG. 8 includes a single loop. The loop follows the perimeter of the communication surface 44 shown in FIG. 1. Other antenna arrangements as well as different numbers of antennas may be employed. For example, in the embodiment shown in FIG. 20, one or more antennas could be arranged about the perimeter of the communication surface provided in the keyboard housing.

Figure 6:
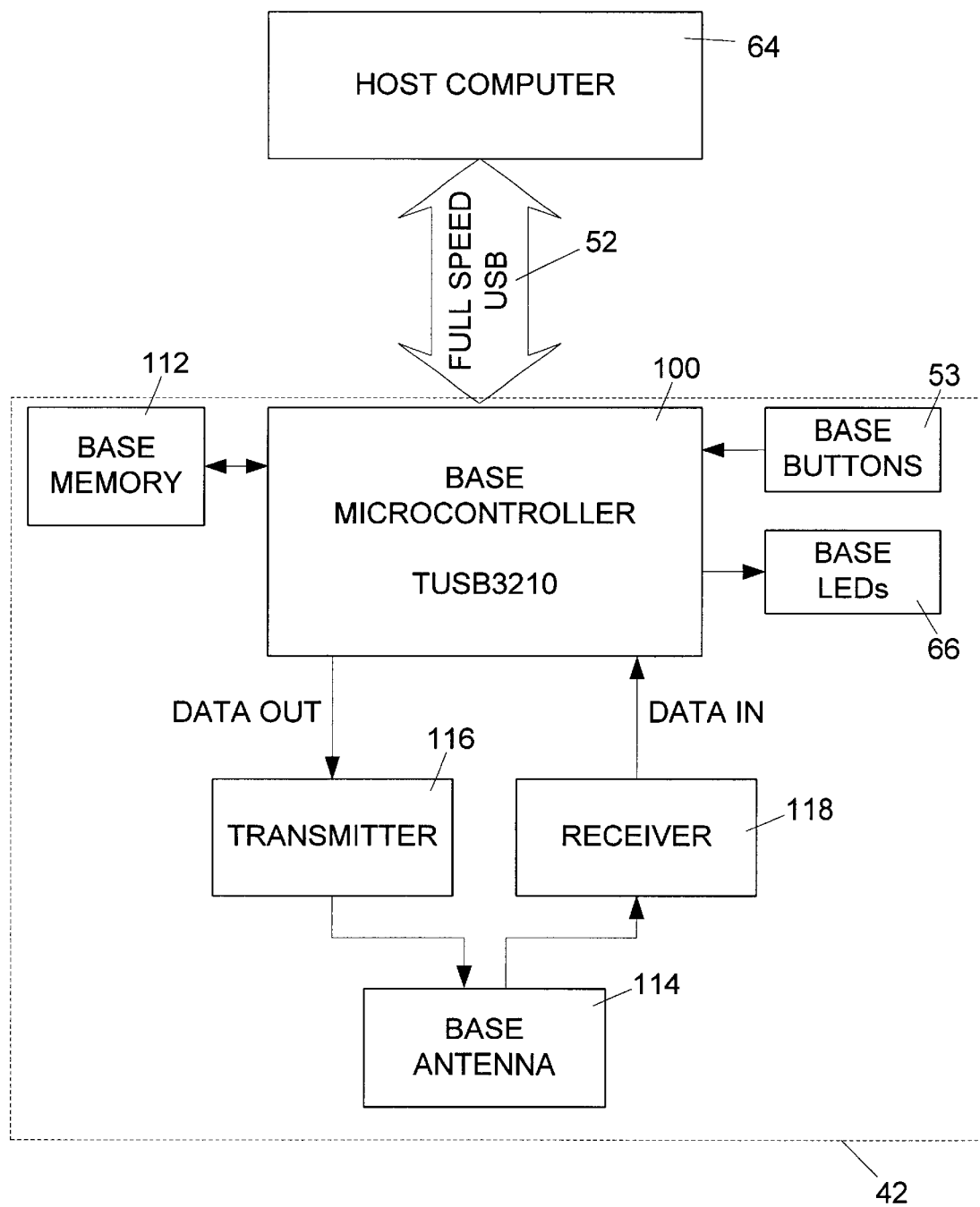
FIG. 6 represents a diagram that illustrates elements of an embodiment of a system according to the present invention and signal flow among the elements.

FIG. 6 schematically illustrates major electronic components of the base according to one embodiment of the present invention. This embodiment of the base is controlled with a base microcontroller 100. One example of a base microcontroller that may be employed according to the present invention is the TUSB3210 microcontroller available from Texas Instruments, Inc. The base microcontroller 100 may communicate with the host computer 64 through USB cable 52 using the known USB 1.1 protocol referred to herein. The USB protocol provides for communicating human input device (HID) interactions with a host computer. Typically, the base 42 may receives all necessary power from the host computer through the USB cable 52. However, the base may also include a power supply, particularly where a connection other than a USB connection is employed.

The base microcontroller 100 may communicate with a base memory 112. Any suitable memory may be employed. One example of suitable memory includes standard $I^2C$ EEPROM. The base memory may store program code and system variables when the base is unpowered. Other information that the base memory 112 may store can include system configuration, user settings, and/or any other desired data.

The base microcontroller 100 may also monitor the status of the base buttons 53 to determine if they are being pressed. The base microcontroller 100 may switch the status of the base LEDs 66 in response to changes in the base mode initiated by pressing the base buttons 53.

The base typically generates an electromagnetic carrier signal. The carrier signal typically is a radio frequency carrier signal that communicates with the input members and may power the input members. As described above, the base includes at least one base antenna 114 to transmit the carrier signal and to receive the backscatter signal produced by the input members. A transmitter 116 generates the carrier signal for the base antenna 114 to transmit. A receiver 118 filters and amplifies the backscatter signal received by the base antenna 114.

By transmitting and receiving identification data, the base 42 may determine the status of each input member 40 in the vicinity of the base. The microcontroller 100 may receive data from each input member 40 and generate appropriate input for a host computer 64.

Figure 7:
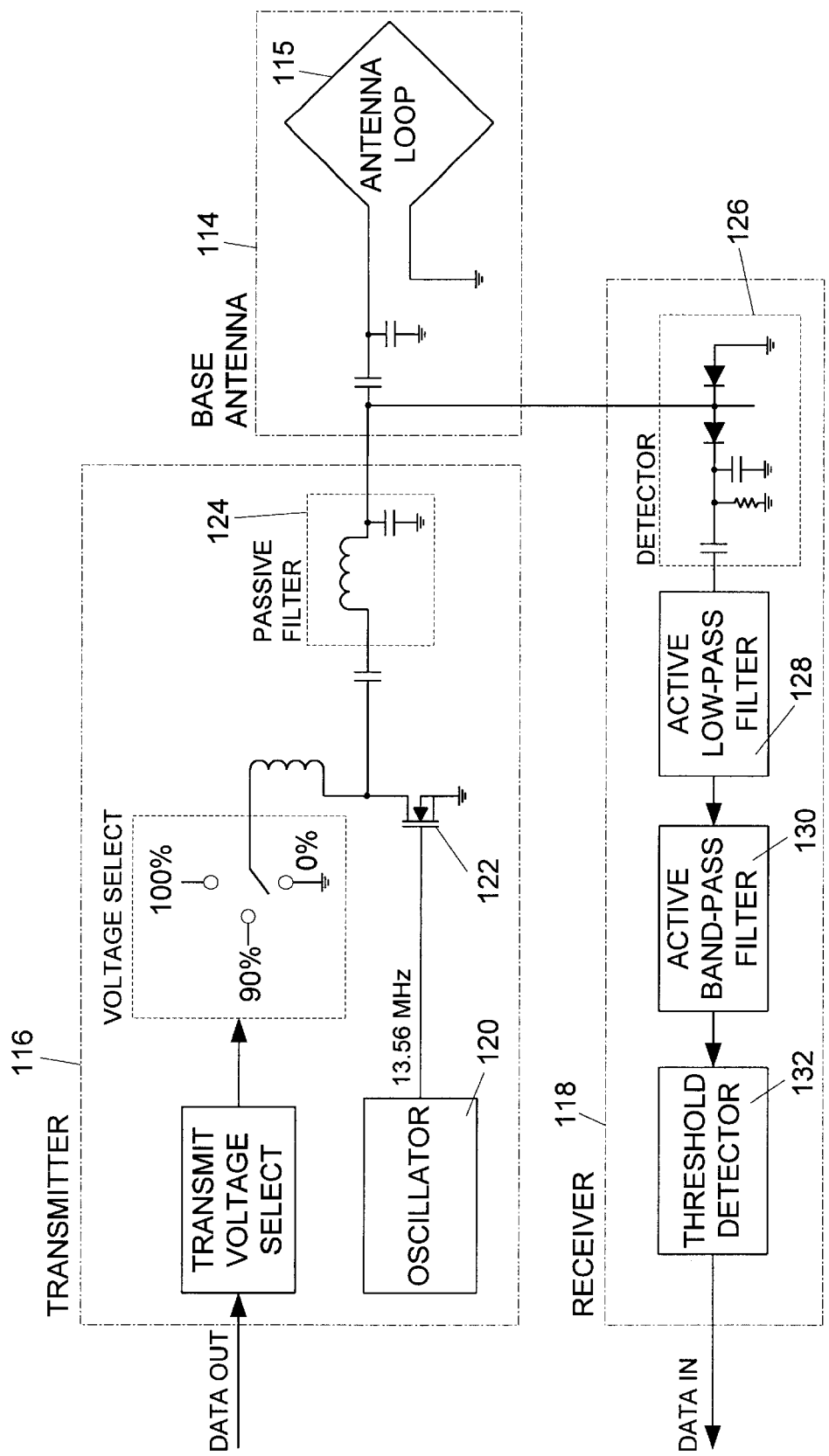
FIG. 7 represents an electrical schematic diagram of an embodiment of a base portion of a computer input device according to the present invention.

FIG. 7 represents an electrical schematic of an embodiment of the base antenna 114, transmitter 116, and receiver 118. The base microcontroller 100 may communicate with the input members 40 by sending a signal (data out) to the transmitter 116 to modulate the carrier signal. The transmitter 116 may employ a 13.56 MHz oscillator, or oscillator 120 that drives a power transistor 122. Data may be sent over digital output lines from the base microcontroller 100 to select the voltage modulation level. The transmitter in the preferred embodiment may broadcast, for example, at 100% voltage, 90% voltage (10% modulation), or 0% voltage (100% modulation). By modulating the output voltage levels, the base 42 may transmit data to the input members 40. Details regarding communication of this type may be found in the ISO 15693 specification. A passive filter 124 may be used after the driver to smooth the waveform and reduce off-frequency energy.

According to one embodiment, the base employs a 10% modulation scheme to communicate with key input members and uses a 100% modulation scheme to communicate with other types of input members. The base may employ two separate modulation schemes for base-to-input member communication. This can help limit unintended "cross talk" in the communication channel.

The output of the transmitter 116 may be transmitted to the base antenna 114, as shown in FIG. 7. The base antenna 114 may use a single-turn loop antenna (magnetic dipole), or antenna loop 115 or any other antenna suitable for RF communication. The base antenna 114 may be tuned to resonate at a carrier frequency of 13.56 MHz. Alternative frequencies may be employed in addition or in place of the one used for this embodiment. The antenna loop 115 of base antenna 114 may be constructed from a 50-ohm coaxial cable or any other suitable antenna component. For the embodiment shown in FIG. 7, only one end of the coaxial cable shield may be connected to ground to allow transmission of the carrier signal, although other shielding configurations are possible.

Any backscatter signals received by the base antenna 114 may be filtered and amplified by the receiver 118. A detector 126 may transmit any modulation of the carrier signal to an active low pass filter 128. According to one embodiment the filter provides over approximately 30 dB of gain at about 430 kHz while attenuating the 13.56 MHz carrier signal. The present invention may also include an active band pass filter 130 centered at about 430 kHz. The active band pass filter 130 can also provide additional gain. A threshold detector 132 may convert the signal to digital levels to send to the base microcontroller 100.

The base communicates with input members operatively arranged in the vicinity of the base. The input members may or may not be attached to the base and/or a cover arranged on at least a portion of the base. Each input member is independently positionable with respect to the base and may or may not be respositionable. Each input member may independently communicate with the base.

The input members may be analog and/or digital input members. Examples of input members that may be employed with the present invention include keys, buttons, button pads, key pads, thumb pads, joysticks, sliders, dials, trackpads, track balls, touch pads and/or jog/shuttle wheels, for example. An input member could actually include more than one input member. Along these lines, an input member could include a slide bank that includes a plurality of sliders. In such a compound input member, the input member as a whole could communicate with the base. Alternatively, each input member that makes up the compound input member could individually communicate with the base.

Figure 3:
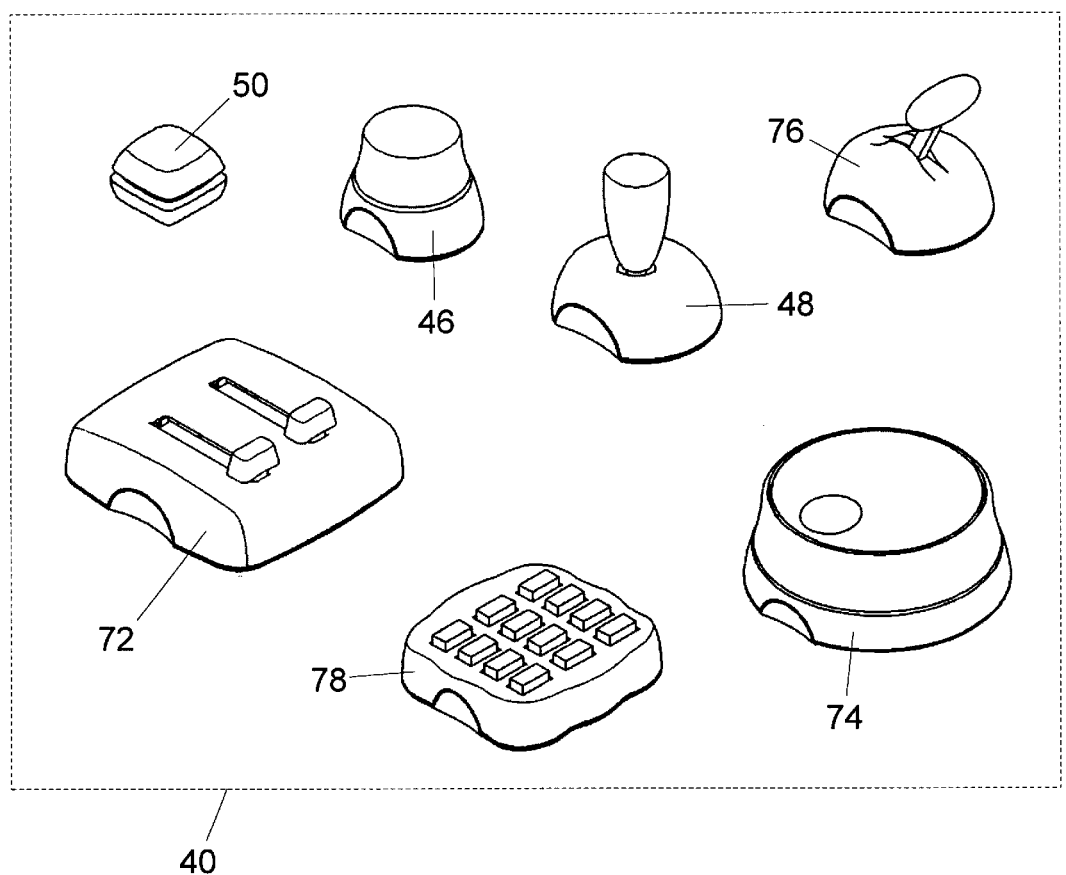
FIG. 3 represents perspective views of exemplary embodiments of a plurality of input members according to the present invention.

FIG. 3 represents a perspective view of examples of input members 40 that may be included in the present invention. The input members 40 include a key 50, a dial 46, a joystick 48, a slide bank 72, a jog-shuttle wheel 74, a fader 76, and a button array 78. These examples of input members are merely representational. A multitude of designs and mechanisms are possible. Other interface elements may also be incorporated with the present invention, alone or in combination. These other interface elements could include LCD displays, touch pads, strain gauge pointing devices, trackballs, and acoustic speakers, for example.

If the input members are attached to the base or to a cover arranged over at least a portion of the base, the input members may or may not be relatively easily removable and repositionable. If not easily removable and repositionable, the input members could be secured with permanent adhesive. While such an adhesive may degrade over time or be removable with a solvent or other means, removing input members secured with such adhesive would not be easy.

Typically, input members attached to the base or to one or more cover members arranged over at least a portion of the base would be easily removable and repositionable. Any suitable means may be used to secure the input members. Typically, the present invention employs a reusable adhesive to removably attach input members to the base or base cover. The reusable adhesive is a soft polyurethane composition that employs a non-permanent, mechanical, surface adhesion for operation. One example of such an adhesive is double-sided Magstick sheet adhesive available from IdeaMax Corp of Costa Mesa, Calif.

The reusable adhesive may be permanently secured to the input members utilizing any suitable means. For example, the reusable adhesive could be secured with a permanent adhesive to the input members. Mechanical or other means could also be utilized. With the reusable adhesive secured to an input member, the input member may be repeatedly attached to, repositioned on, and removed from the base and/or the base cover 58.

When a user places an input member onto a suitable surface of the base or base cover, the exposed (bottom) side of the reusable adhesive can non-permanently adhere to the surface, thereby affixing the input member in place. The reusable adhesive can provide a temporary bond that is secure enough for typical user input operations, but does not create a strong shear bond. The relatively weak shear bond created between the reusable adhesive and the base or base cover can permit a user to remove an input member by gently twisting and pulling up on the input member. A user may then reposition the input member in a new location or remove it from the base. The reusable adhesive has the added property that it may be cleansed with water and/or a mild soap or detergent. Cleaning and drying the reusable adhesive restores the adhesive properties of the adhesive so that is can again provide a convenient and reusable attachment means.

Other means could also be employed to removably attach input members to the base or base cover. Along these lines, a relatively poor adhesive, along the lines of the adhesive used in POST-IT notes could be employed. Even a hook and loop closure, such as VELCRO could be utilized. Along these lines, one of the hook and loop could be arranged on the base or base cover and the other of the hook and loop could be arranged on the input members. Mechanical means on the base, base cover, and/or input members could also be employed to secure the input members to the base or base cover.

In some embodiments, at least one or all of the input members may be permanently attached to the base or base cover. In such embodiments, permanent adhesive could be employed to secure the input members to the base or base cover. This could help to create a device that a user would not worry about having an arrangement of input members altered.

Typically, each input member is independently positionable anywhere on the base or base cover. In other words, each input member may be arranged in an infinite number of locations on the base or base cover. However, for some embodiments, the input members may be arranged only in designated locations. Such embodiments could include a grid of positions where input members could potentially be arranged. Alternatively, the positions could be arranged in other configurations.

FIG. 1 illustrates an embodiment of the present invention with the a plurality of input members 40 arranged on the base. The input members include a plurality of individual keys 50, a joystick 48 and a dial 46. FIG. 2 illustrates the same input members in a similar arrangement arranged on a base cover 58.

Internally and operatively, the input members may vary. For example, digital input members, which typically have functions other than single switches, may employ microprocessors connected to a coil and one or more electromechanical elements. Examples of digital input members include rotary encoder dials and digital joysticks. The electromechanical element outputs are connected to digital input pins of the microprocessor. On the other hand, analog input mechanisms, may include a microprocessor that employs an analog-to-digital converter and may be connected to a coil and one or more analog input members. Examples of analog input members include potentiometers and variable resistance sliders. Supporting separate electronic circuit designs for different types of input members can provide a more flexible input device. The combined design allows simple "make or break" controls to use industry standard RFID components, thereby lowering the complexity and cost of the input mechanism, while still allowing more complicated controls to be used. The protocol utilized by the base can provide for communication with multiple input mechanism types, and can allow the base to prioritize the communications with them. Each input member may contain or be assigned an identifier that uniquely identifies it to a particular base.

FIGS. 4A, 4B, 5A, and 5B illustrate the general mechanical construction of a number of different input members. Each of these input members includes one or more electromechanical actuators connected to an electrical circuit contained within a housing. Other input members may be constructed in a similar manner.

Figure 4A:
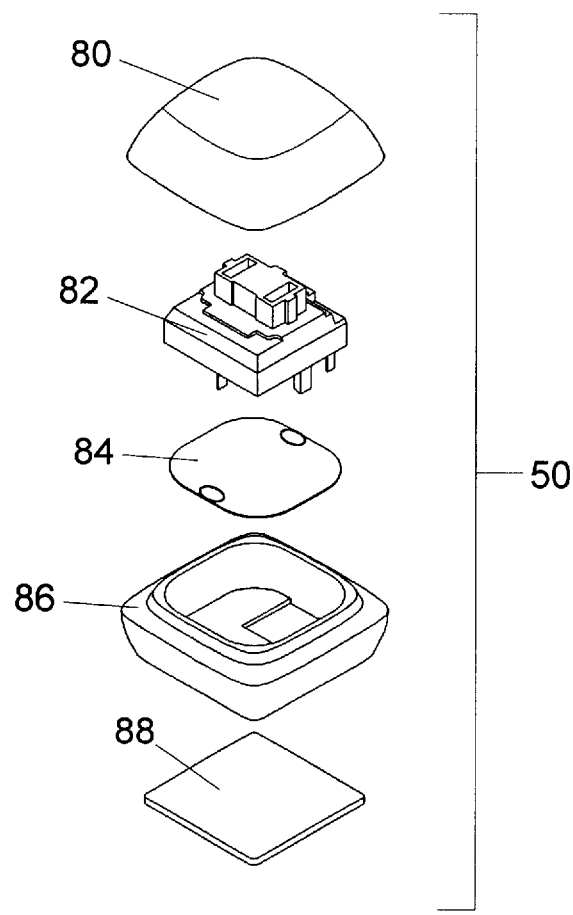
FIG. 4A represents an exploded view of an embodiment of an input member according to the present invention.

In particular, FIG. 4A shows an exploded view of an embodiment of a mechanical assembly for a key. The key includes a key cap 80 mated to a mechanical key switch, or key switch 82. Any suitable key switch could be employed. One specific example of a key switch is an ML series key switch available from The Cherry Corporation, Waukegan, Ill. 60087.

The key switch 82 may be electrically connected to a printed circuit board, or key PCB 84. The key PCB 84 may include electronics operable to communicate with the base 42. The key switch 82 combined with the electronics on the key PCB 84 is included in the circuit shown in FIG. 10. Any suitable printed circuit board could be utilized.

Figure 4B:
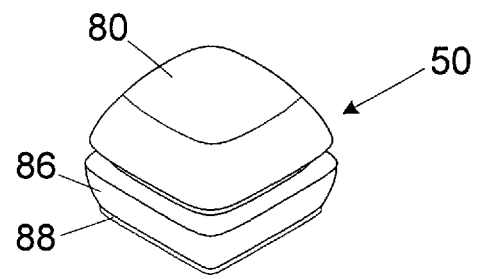
FIG. 4B represents a perspective view of the input member shown in FIG. 4A in an assembled state.

The key cap 80, the key switch 82, and the key PCB 84 may be assembled in a housing or key base 86. A reusable adhesive, or adhesive 88, may be applied to the bottom of the key base 86. The reusable adhesive or adhesive may be secured to the key base 86 bottom, as shown in FIGS. 4A and 4B. FIG. 4B shows the assembled key 50.

Figure 10:
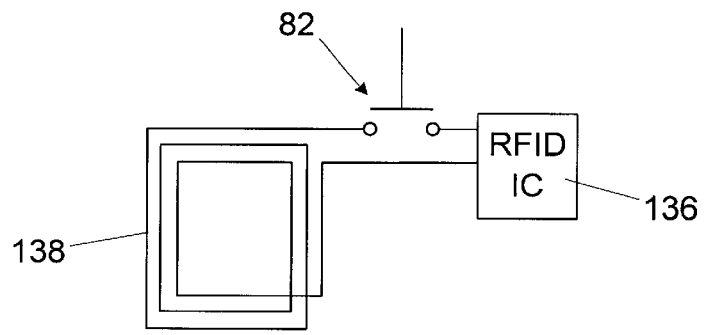
FIG. 10 represents an electrical schematic diagram of an embodiment of circuitry for an input member according to the present invention.

FIG. 10 shows the electrical schematic for the embodiment of the key 50 shown in FIGS. 4A and 4B. In the embodiment shown in FIG. 10, a key switch 82 connects a radio frequency identification integrated circuit, or RFID IC 136 to a coil antenna, or key antenna 138. The key antenna 138 receives the RF carrier signal generated by the base. When the switch 82 is closed, typically by pressing by a user, the RFID IC 136 may be connected to the key antenna 138, and can receive power from and communicate with the base 42.

The RFID IC 136 used in the input members typically conforms to the ISO 15693 standard. Of course, another protocol could be utilized if it is functional. Each RFID IC 136 typically includes a unique 64-bit identification number and a 416 bit rewritable EEPROM memory. Anticollision algorithms, described below in greater detail, within each RFID IC 136, and separate key antennas 138 for each key 50 can allow multiple keys to be active simultaneously and to communicate with the base using the same carrier signal.

The key antenna 138 may employ a tuned design. Known designs can include a discrete capacitor in the resonant circuit to tune the circuit resonance frequency. The addition of a tuning capacitor may increase production complexity and cost for an input member. By employing a tuned antenna design, the present embodiment may eliminate the requirement for a tuning capacitor. The antenna size, number of coil turns, and turn spacing may be adjusted to provide a circuit with a closed key switch 82 and an RFID IC 136 that resonates naturally near the carrier signal frequency of 13.56 MHz. The resonant frequency of an RF circuit is related to its inductance and capacitance by the relationship:

$$F \propto \frac{1}{\sqrt{LC}}$$

The antenna design in the present embodiment was selected from a test matrix of antenna designs that explored various antenna parameters, such as antenna size, number of coil turns, and turn spacing. Measuring the performance of each antenna design in the test matrix yielded an input member antenna having an inductance that matches the capacitance of the closed circuit for the desired resonance frequency. The coil design was selected such that the inductance of the coil and circuit, in relation to the distributed capacitance of the circuit and the capacitance within the RFID chip, produces a naturally resonant circuit. This naturally resonant circuit does not require the addition of a discrete capacitor element to resonate at the desired operating frequency. Of course, the input members may include extra tuning capacitors if they are required or desired for a particular embodiment.

Figure 5A:
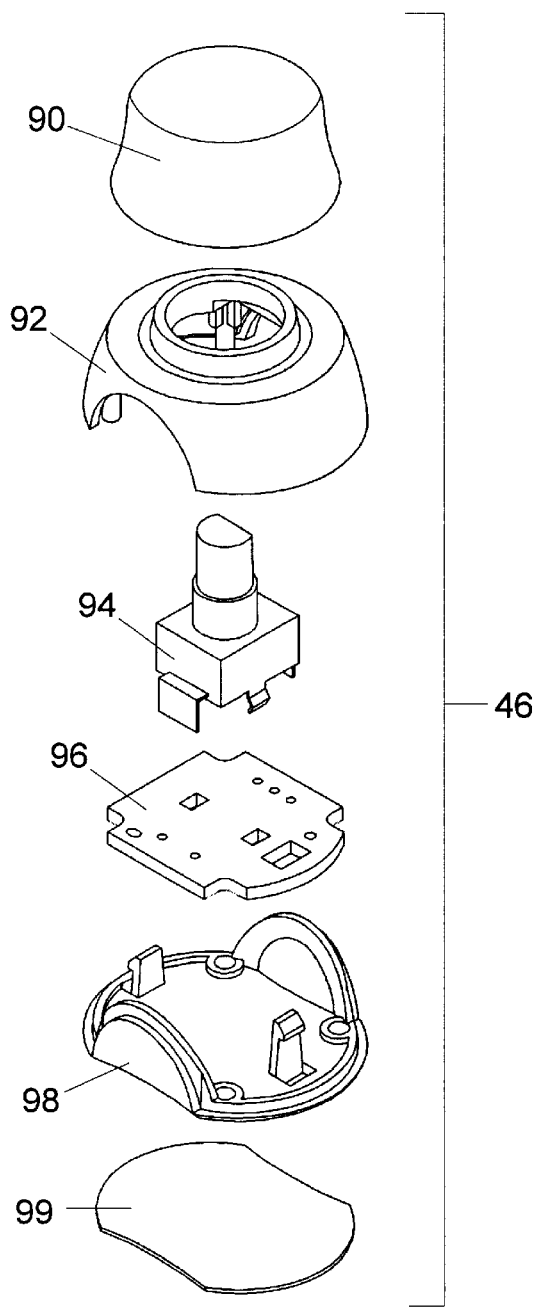
FIG. 5A represents an exploded view of another embodiment of an input member according to the present invention.

FIG. 5A represents an exploded view of the mechanical assembly for another embodiment of an input member according to the present invention. The input member shown in FIG. 5A is a dial 46. A dial cap 90 may be mated to a dial rotary encoder, or rotary encoder 94, through an opening in a dial housing top 92. Any rotary encoder may be utilized. One example of a rotary encoder that may be employed with the present invention is model #290UAA5F201B2 available from CTS corporation of Elkhant, Ind. The rotary encoder 94 may be electrically connected to a printed circuit board or dial PCB 96. The dial PCB 96 may include electronics operable to communicate with the base 42. The rotary encoder 94 combined with the electronics on the dial PCB 96 are included in the circuit shown in FIG. 11. Any suitable printed circuit board could be utilized in the dial PCB. According to one embodiment, the dial PCB 96 made from a two-layer FR4 rigid-board material, but as with the key PCB 84, any suitable material may be used.

Figure 5B:
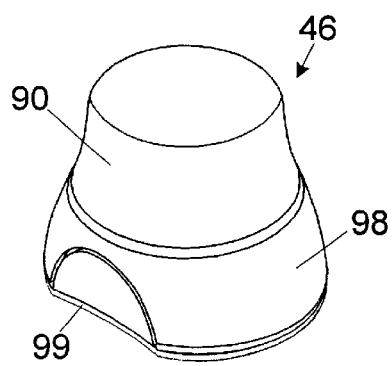
FIG. 5B represents a perspective view of the input member shown in FIG. 5A in an assembled state.

The entire assembly may be mounted to a dial housing base 98, as shown in FIG. 5B. A reusable adhesive or adhesive 99 may be applied to the bottom of the dial base 98. The reusable adhesive or adhesive may be secured to the dial base 98 bottom, as shown in FIG. 5B. FIG. 5B shows the assembled dial 46. Although it has a different shape to cover the larger dial housing base 98, the adhesive 99 may be constructed of the same material as the key adhesive 88.

Figure 11:
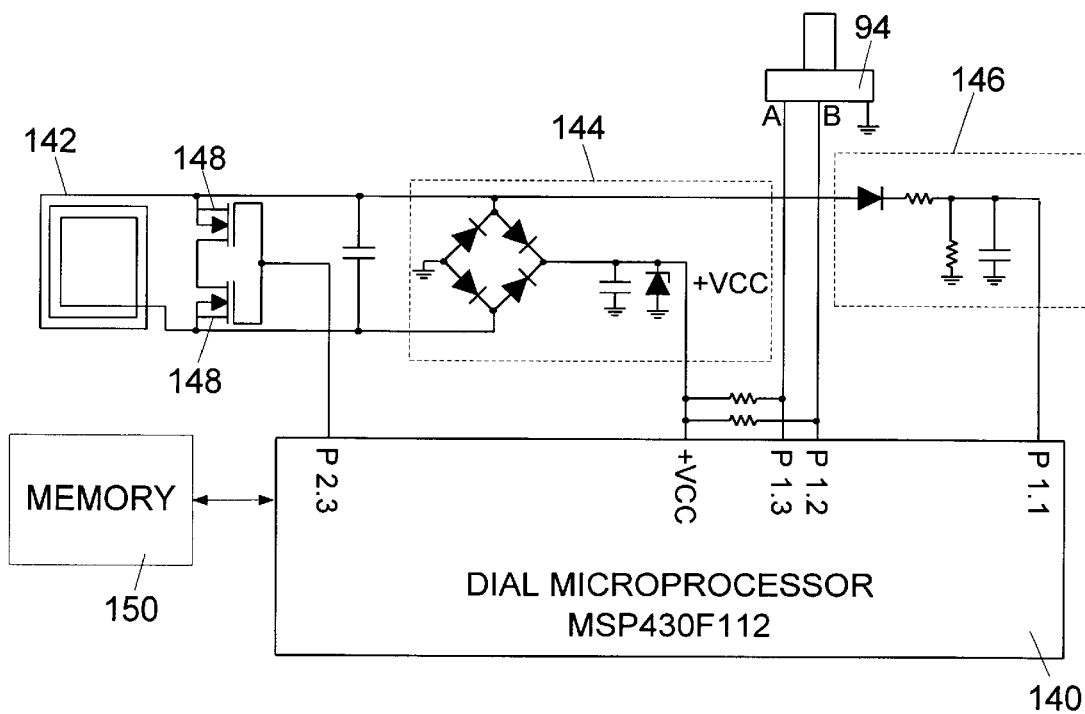
FIG. 11 represents an electrical schematic diagram of an embodiment of a digital input member according to the present invention.

Input members, such as the dial shown in FIGS. 5A and 5B, that provide more complex input means than the single switch of the key may not employ the standard RFID IC. Instead, these input mechanisms may employ low-power microprocessors connected to an RF circuit. FIG. 11 shows an embodiment of an electrical schematic for the electronic circuit that may be employed with a dial. When the dial is placed in the vicinity of the base, a coil antenna, or dial antenna 142 receives the RF carrier signal generated by the base. A full-wave bridge rectifier circuit 144 may condition the RF signal received by the dial antenna 142 to provide power for a dial microprocessor 140. Any suitable microprocessor may be utilized. According to one embodiment, the dial microprocessor is an MSP430F112 series available from Texas Instruments, of Dallas, Tex. A half-wave rectifier circuit combined with an R/C circuit may constitute an input circuit 146 that may be connected to an input pin of the dial microprocessor 140.

The input circuit 146 can permit the microprocessor to detect 100% modulation of the RF carrier signal generated by the base. The base may use 10% modulation of the carrier signal to transmit data to key-switch type input members. The base may use 100% modulation of the carrier signal to transmit data to other types of input members. This design can permit the input circuit 146 to only transmit to the dial microprocessor 140 only data intended for non-key-switch type input members.

The dial microprocessor 140 may transmit data back to the base using backscatter modulation. The dial microprocessor 140 can momentarily shunt the dial antenna 142 with a pair of MOSFETS 148. This shunting induces a voltage drop in the coupled base antenna 114 that is detected by the base. Communication frames composed of timed shunting cycles, which may be near 430 kHz, can provide a data transfer means from the dial 46 to the base.

The dial microprocessor 140 may monitor the status of the rotary encoder 94, a profile of which is shown in FIG. 5A. When a user turns the dial cap 90 mated to the rotary encoder 94, the dial microprocessor 140 may detect and communicate the change in position to the base. The dial microprocessor 140 may be connected to external memory 150, such as I$^2$C EEPROM. The memory 150 can store code and data when the dial 46 or any other input member that includes memory is not powered, such as when the dial or other input member is removed from the communication surface. Other uses for the input member memory are described below.

Figure 12:
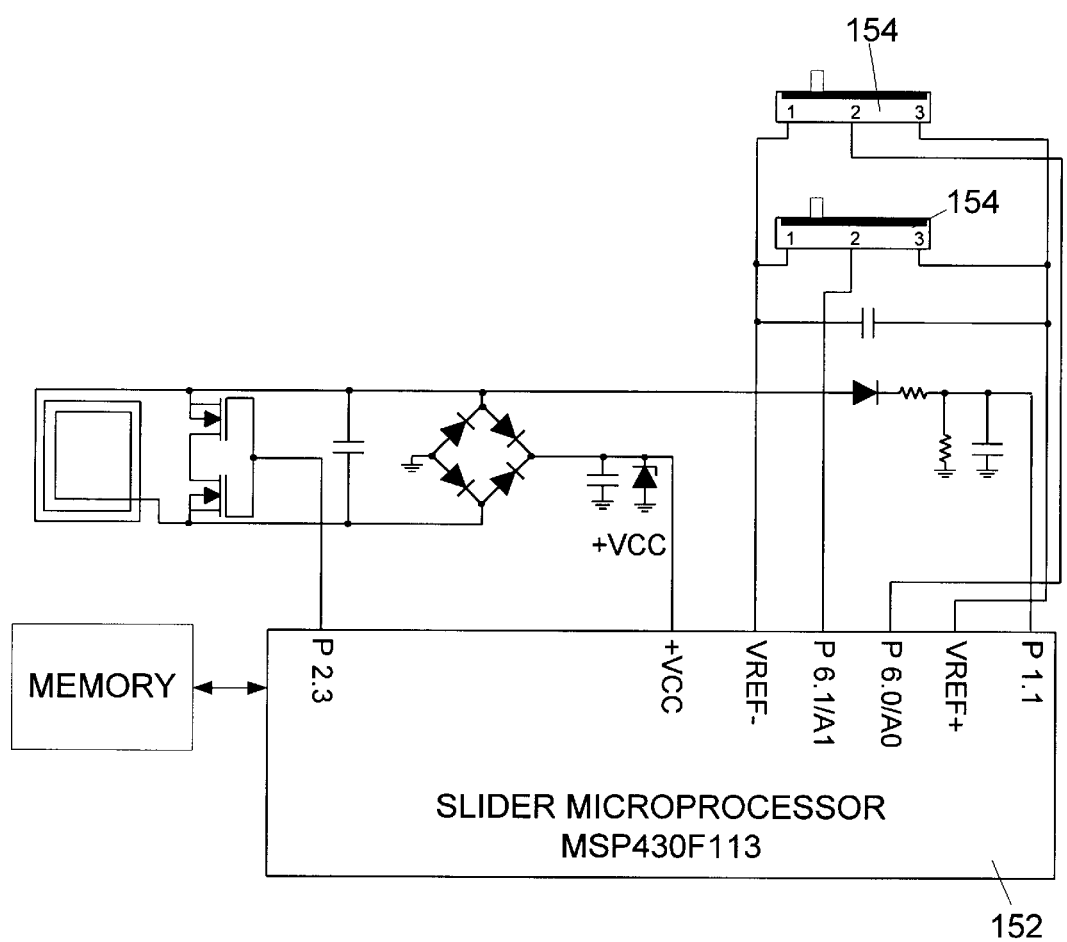
FIG. 12 represents an electrical schematic diagram of an embodiment of an analog input member according to the present invention.

FIG. 12 represents a schematic of an embodiment of an electrical circuit for a slide bank input member, such as the slide bank 72 shown in FIG. 3. The slide bank 72 may include a pair of slide potentiometers 154 as electromechanical input elements. Any slide potentiometer may be used. According to one specific example, the slide potentiometers 154 are model #448VCX103BDN available from CTS Corporation of Elkhart, Ind. Unlike the digital rotary encoder 94 used by the dial 46, manipulating the slide potentiometers 154 can produce a variable resistance that typically needs to be converted to a digital signal. The slide bank 72 may include a slider microprocessor 152 that can include an analog-to-digital converter to convert the variable resistance in the slide potentiometers 154 to a corresponding 12-bit number. Any microprocessor may be utilized. One particular example of a slider microprocessor is MSP430F113 series available from Texas Instruments of Dallas, Tex. The power, rectification, communication, and memory components of the slide bank may all operate in the same manner as similar circuits in the dial 76 discussed above. The slide bank 72 demonstrates the additional capability of analog-to-digital conversion means, and the addition of a second electromechanical element.

As described above, an input member may include memory. By including memory in the input members, the input members can store and transmit information in addition to a status identifier. Typically, with known devices that employ RFID technology, data in the RFID object is used only to distinguish the mechanism that has been activated. Input members according to the present invention may store information beyond simply the identification data. For example, the input members may store information about their individual capabilities. This information may be transmitted to and used by the base allowing the base to learn and adapt to new input members. Input members according to the present invention may also store information that may be transmitted when they are activated.

The input members may also store other, more complex types of information. Examples of such can include strings of characters, macro sequences, or computer programs delivered to the base. This can allow the input members to operate as information containers, and to hold data independent from any particular base/host configuration.

Along these lines, the input members may deliver data payloads to a host computer through the base. This can provide a novel means of delivering new software functionality. For example, it is possible for a software vendor to provide users with new software functions by providing an input member that contains the new capability. To add this capability, a user could place the input member in operable proximity to the base. The data payload would then be transferred to the host computer. The user would then be able to use the input member in conjunction with the new software function, providing a fast, convenient, and novel way to improve computer function. Other examples of data that may be stored in the input member memory include, but are not limited to, executable code, scripts, application plug-ins, user identity data (such as business card information), passwords, electronic images, and/or advertising information.

Rather than always relying on the base to interpret the meaning of actuation of an input member, an input member according to the present invention may include information that the input member should deliver when actuated. For example, an input member may have the ability to not only indicate that it has been actuated, but it may also transmit to the base an appropriate key scan code that may be sent to a host computer. With this improvement, the function of an input member may be stored within the input member itself. A user could program an input member on one base, then transfer it to, and use it on, another base without any extra programming steps. Therefore, it is not necessary that the base already know about the input member.

Input members of the present invention may include derivatives of the four circuits shown in FIGS. 9–12. Of course, those of ordinary skill in the art may employ other circuits or alterations of the circuits shown in the input members. The circuits shown and described herein are only representational of the many possible input members and circuits. For example, each input member can employ more than one antenna. For example, each input member may employ a single antenna for power reception, base-to-input member communication, and input member-to-base communication. Although separate antennas could be used, it is typically desirable for space savings, design simplicity, reduced cost, among other reasons to use one antenna. Other input members could include other features, for example, digital-to-analog conversion, display means, such as moveable LCDs, touch pads, trackballs, pointing devices, and/or audio speakers.

While wireless communication that is utilized according to the present invention may be known, the communication of information between the base and the input members and the communication between the base and multiple input members is not known. Additionally, the present invention typically provides communication from the input members to the base and vice versa, rather than just one-way communication from an input mechanism to a receiving unit. Two-way communication can permit storage and retrieval of data in an input member. Furthermore, two-way communication may provide other benefits including: dynamic addressing of input members, input members that only transmit data when requested by the base, and multiple communication protocols support by a single base.

Communication back and forth between the input members and the base may take place according to any number of different protocols. For example, the base and the input members may communicate constantly. Alternatively, the base and the input members may only communicate when a change in the status of the input member has taken place. In some cases, an input member many communicate with the base only upon after interrogation by the base.

According to one embodiment, the present invention includes a novel communication protocol such that input members may elect to seek communication with the base only when they have changed status. This can significantly reduce the amount of data communication traffic the base must support. Instead of merely polling each device to determine its status, the input members can keep track of their own state, and only report changes in that state to the base. Essentially, this process can shift much of the burden of monitoring user input from the base to the individual input members.

For example, a dial-input mechanism may contain an internal counter that is representational of the dial position. If the user does not move the dial, this counter typically would not change, and the dial would not reply to a request from the base to report any status changes. Once the user moves the dial, the internal logic may recognize the change, and transmits this information to the base after an appropriate request has been made.

The present invention employs a multiple object, multiple-protocol anticollision algorithm to allow a variety of input member types to communicate efficiently with the base. Although known devices may teach a single fixed keyboard that may operate with RFID readers, no provision is made to operate with multiple separate input members simultaneously. The separate protocols according to the present invention used to communicate with each type of input member allow adaptation to a variety of user input needs. For example, for applications where input member response time is important, such as games that require quick key activation speeds, the present invention is capable of servicing key presses with a higher priority than other, less time-critical input mechanisms. The ability to manage different protocols and service different input mechanism types separately is a dramatic improvement over the prior art.

The present invention can also provide dynamic identification storage. Along these lines, the present invention can provide the capability to individually address each input member separately. Known RFID input devices only provide for a single interaction, because only one input member is considered. On the other hand, according to the present invention, the base may assign dynamically a unique identification number to an input member as the input member is introduced to the field. This unique identification (ID) assignment can allow the base to adapt to the introduction of new input members to the input device. It can also allow multiple copies of an input member, such as a dial, to be individually interrogated by the base without the need to provide an identification number for each input member at the time of manufacture. By dynamically allocating ID for certain input members, the present invention provides a more flexible device as compared to known input devices. Of course, the present invention may work with both dynamic and fixed unique IDs, according to the needs of the particular embodiment.

The base may detect the status and/or change in status of the input members. The base then typically converts signals received from the input members into standard computer input signals, which it may then transmit to a host computer. The conversion could take place using, for example, the USB HID protocol for keyboards, mice, and other human interface device standards. For example, it is possible with the present invention to either send the turning of a dial as a dial turn under the HID dial standard, as a key press, or as a custom function call with the amount a dial turned passed as a parameter. Alternatively, the base may transmit the signal in an unaltered state or translated into a form other than standard computer input signals. In this case, the host computer would translate the signal received from the base into another form.

As stated above, the present invention may communicate with multiple input members that may also be of different types. According to one embodiment, the base may scan input members that are keys separately from other types of input members. There are a number reasons why this method of interacting with multiple input members is desirable. For example, keys may be smaller and typically more numerous than the other types of input members. Keys are often used for input to applications where a fast response time is important, such as computer games. Additionally, keys may use a protocol (ISO 15693) that allows the status of a group of them to be scanned in a single communication frame using anticollision protocol of the invention, instead of being polled individually. Input members that do not use a key circuit, such as that shown in FIG. 10, typically are not as response time critical.

One embodiment of the present invention may employ a slower communication baud rate for some input members, such as a slider bank and a dial. According to this embodiment, such members may be polled individually. By using multiple communication protocols for separate input members, the base may optimize communication for performance and flexibility.

Figure 13:
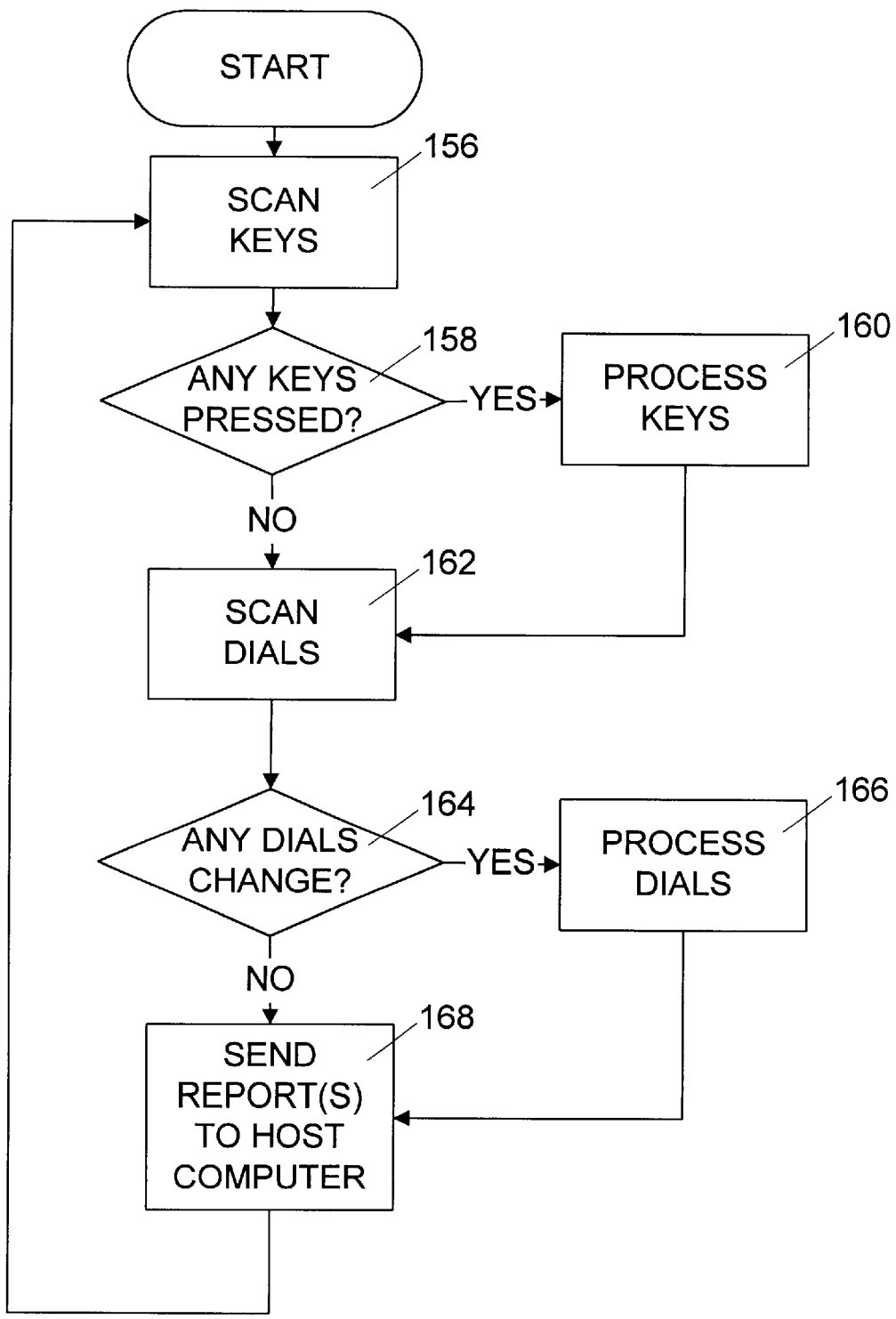
FIG. 13 represents a flow diagram that illustrates an embodiment of a base operation protocol for querying individual input members.

FIG. 13 represents a flow chart that illustrates a simplified example of an embodiment of an operational protocol according to the present invention. According to this embodiment, the base may interact with some keys and some dials that are operatively arranged in the vicinity of the base. The base may initiate a scan cycle by scanning for keys 156. If any keys are detected in the pressed state 158, the base may process the identity 160 of the pressed keys and determine corresponding input functions that may be sent to a host computer. Once the key processing is complete, or if no keys are pressed, the base may scan each dial 162 to determine its current rotation 164. If the base identifies any dials that have changed from their previous rotation value, the base may process the new dial rotation 166 and determine corresponding input functions to be sent to a host computer. Once the dial processing is complete, or if no dials have changed rotation value, the base may send any new key and dial input reports to a host computer 168. The base may then return to start the cycle again. An advantage offered by this algorithm is that the base can take advantage of and accommodate different types of input members in the same communication environment. This simplified example may, of course, be expanded to include any number of input member types that may be processed separately by the base.

Figure 14:
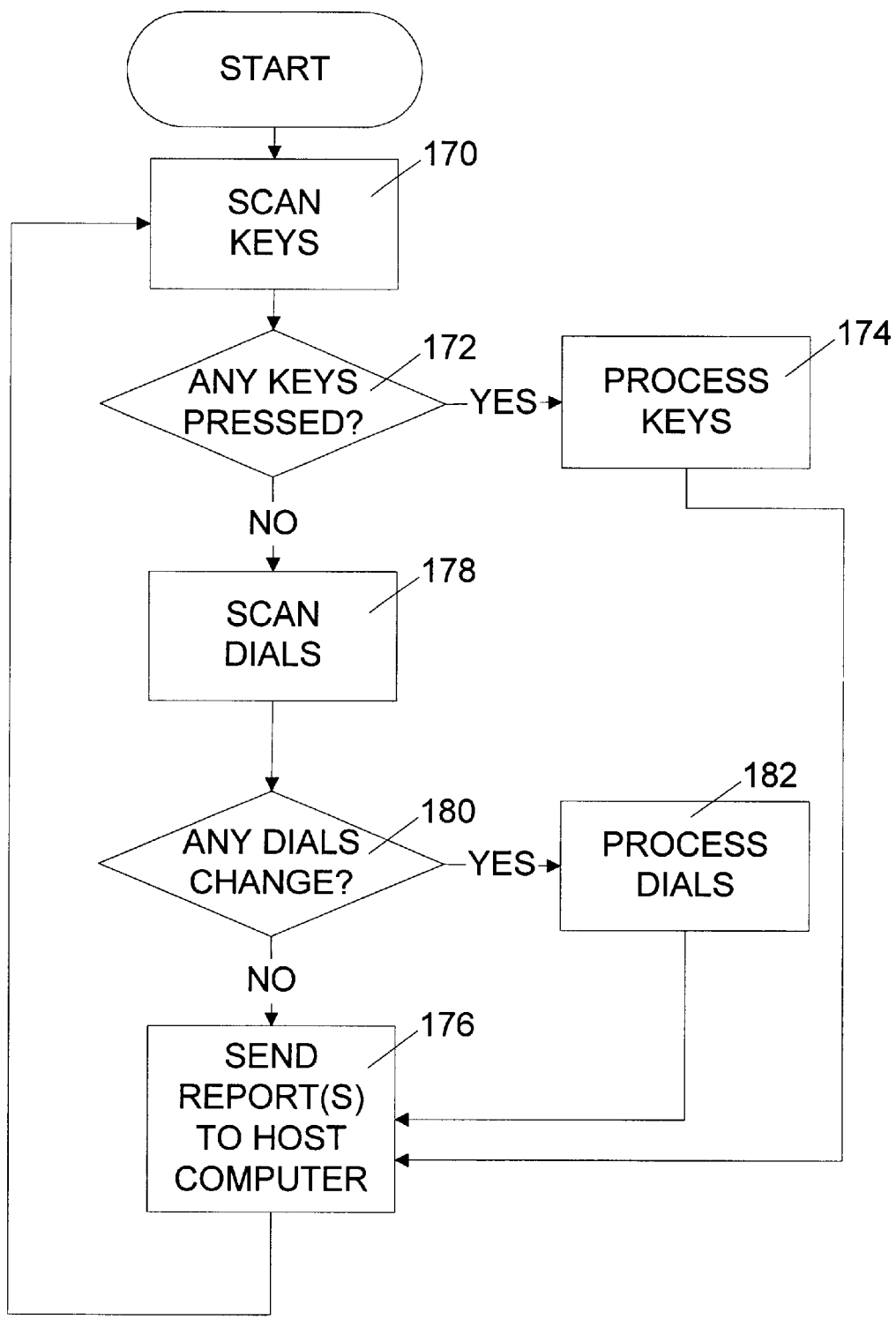
FIG. 14 represents flow diagram that illustrates an embodiment of a multi-object priority adjustment of a base operation protocol according to the present invention.

FIG. 14 represents a flowchart that illustrates another embodiment of an operational protocol according to the present invention. This flowchart illustrates another advantage of being able to communicate with multiple types of input members. The flow chart illustrates a similar scanning process as in the embodiment shown in FIG. 13 when scanning a similar assortment of keys and dials. However, in the embodiment shown in FIG. 14, the base places a priority on user input from the keys. When the base scans 170 and detects any keys in the pressed state 172, it processes the identity 174 of the pressed keys and determines the corresponding input functions to be sent to the host computer. However, in the mode of operation illustrated in FIG. 14, the base will skip scanning for the dials 178 and immediately send the key input to the host computer 176. Only when no keys are depressed will the base scan the dial rotation 178, check for any rotation value changes 180, and process dial input reports 182. Of course, it is possible to add timeout routines to this algorithm to make sure that the dials will be processed even if a key is held in the pressed state for an extended period of time. A feature of this embodiment is that it can selectively process and prioritize input data from multiple types of input members within the same environment. This capability can provide other optimization and scheduling capabilities between and among input members.

Figure 15:
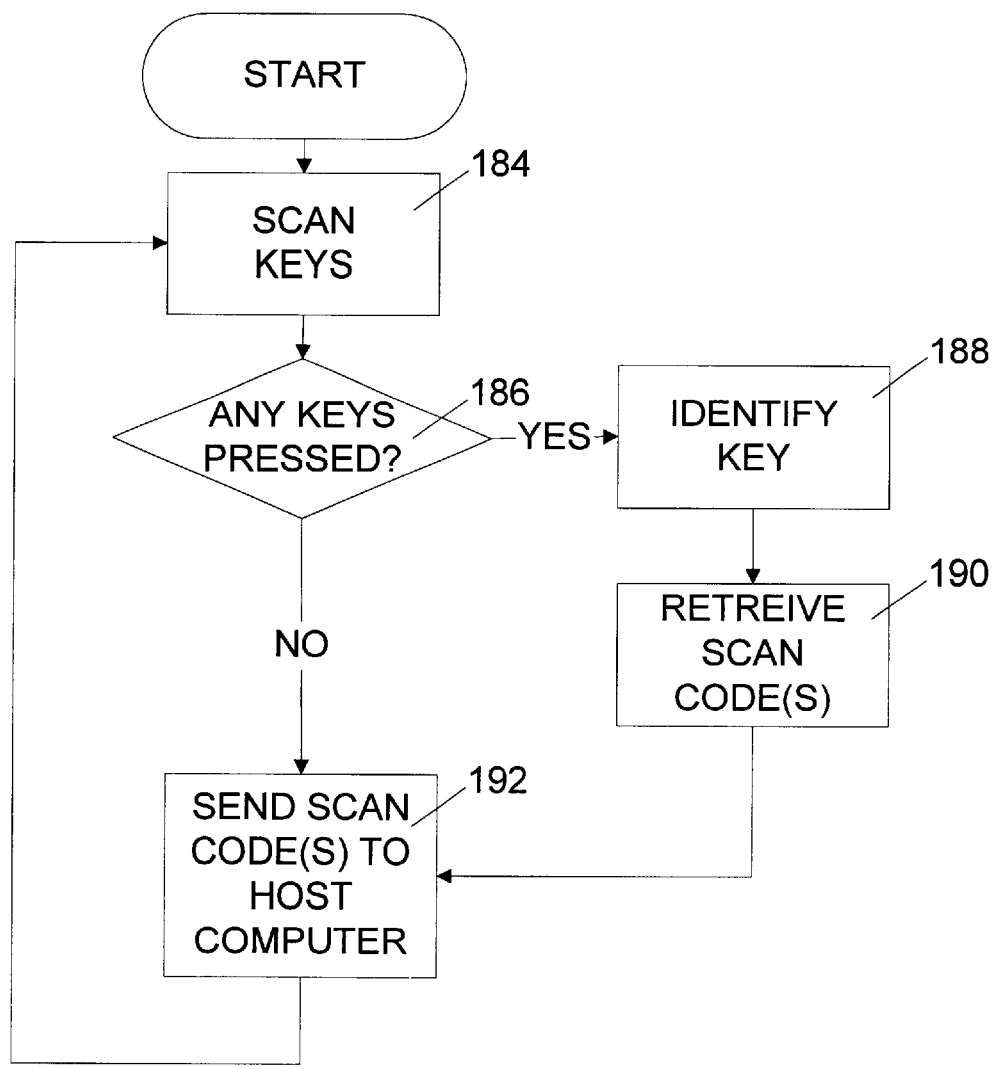
FIG. 15 represents a flow diagram that illustrates an embodiment of a process for storing and retrieving information within an input member.

FIG. 15 represents a flow diagram that illustrates another embodiment of an operational protocol according to the present invention. This embodiment illustrates differences between the present invention and some known input devices, particularly known input devices that rely on a base unit microprocessor to identify and interpret their actuation status of individual input mechanisms and to generate a corresponding input code for a host computer. For example, in a traditional keyboard, each key is identified by the keyboard microprocessor to represent a key scan code that is sent to a host computer. The key module itself only provides a switch; the key scan codes are located in the keyboard microprocessor. Even known programmable keyboards store updated scan code information in the microprocessor and/or host computer.

On the other hand, the present invention provides a novel method of storing input to be sent to a host computer within the input member itself. For example, in one mode of operation of the present invention, a key may store an actual key scan code, or sequence of codes, that it represents in addition to its identification data. In the mode of operation shown in FIG. 15, the base may interact only with a group of keys in the vicinity of the base. The base may continue to scan for keys in the pressed state 184 until one or more key presses are detected 186. Once a key is found in the depressed state, the key may be identified by its unique identification means 188. The base may then retrieve the scan code 190, or sequence of codes, from the key memory within the RFID IC 136. The base may then forward the retrieved scan code(s) to the host computer 192.

This simple example demonstrates the improvement of storing input data within an input member itself. Of course, other input members besides keys could use this technique to provide input information to the base. Although not shown in FIG. 15, the base also has the ability to change or update the input data stored in the input members. Furthermore, by storing this information in the input member, the base does not need to know about a particular input member prior to their mutual introduction. An input member could be assigned on one base, then moved to another base and operate without any further programming. Alternately, input members according to the present invention may be preprogrammed and delivered to users separately from the base, allowing their immediate use without requiring additional setup or programming. Software manufacturers may develop sets of input members that function "out of the box" with existing bases. The input members according to the present invention can deliver their input data to the base directly.

Figure 16:
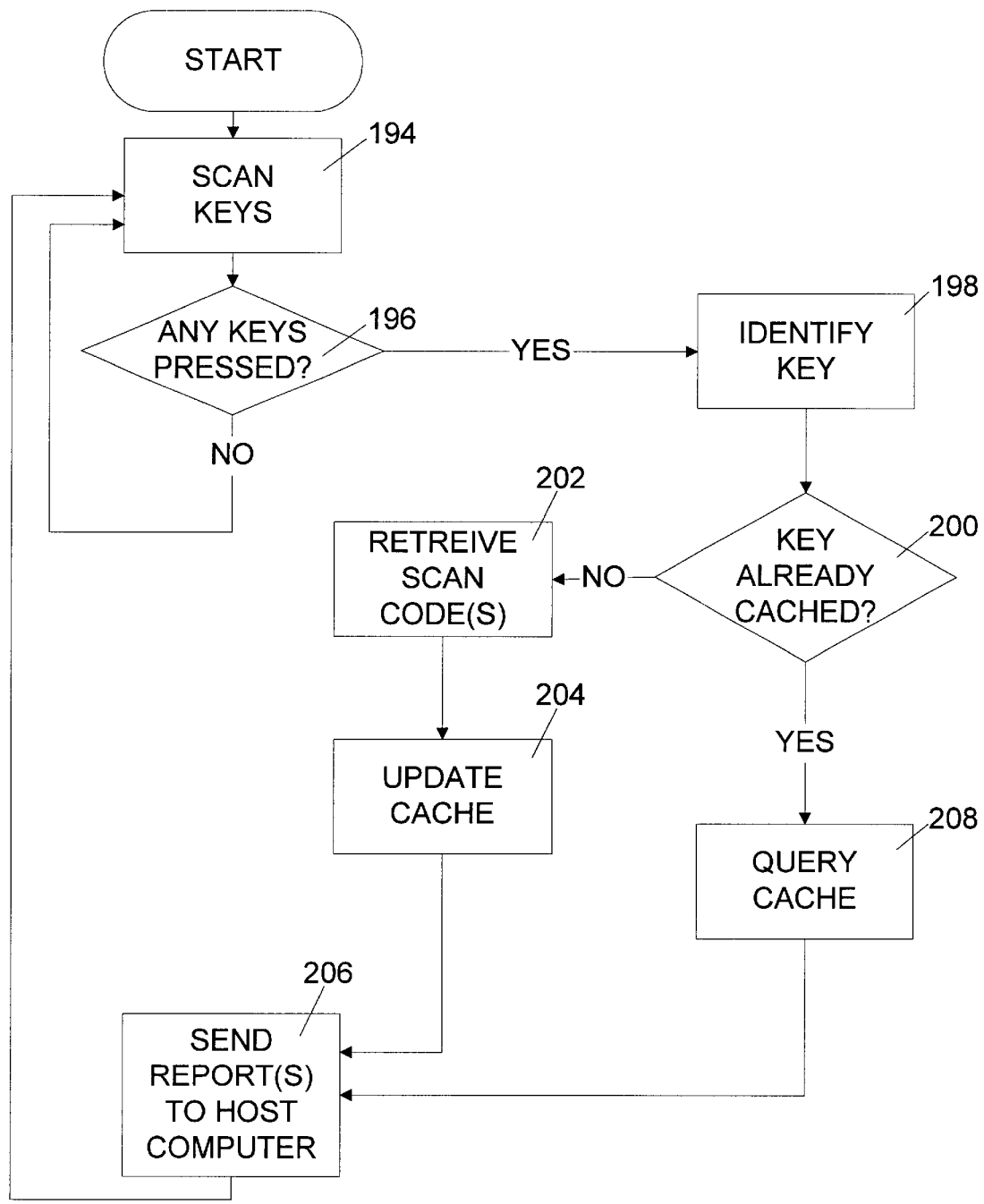
FIG. 16 represents a flow diagram that illustrates an embodiment of a process of input member caching.

Another advantage of the present invention is input data caching. FIG. 16 represents a flowchart that illustrates another embodiment of an operational protocol according to the present invention that includes input data caching. Input data caching can allow the present invention to combine the benefits of input data retrieval from the individual input members, shown in FIG. 15, with the increased response time of the direct scan shown in FIG. 14.

The embodiment of the process shown in FIG. 16 includes a simplified operational mode where the base may only interact with a group of keys in the vicinity of the base. The base may continue to scan for keys in the pressed state 194 until one or more key presses are detected 196. Once a key is found in the pressed state the base identifies it 198. The base may then check an internal memory (or cache) to determine if the particular key has been previously identified 200. If the base (since being powered on, for example), has not communicated with the key before this point, the base may then retrieve the scan code(s) from the key memory 202. The base may then update its internal memory (cache) with the key identity and its corresponding key scan code(s) 204. The base may then send the input data 206 from the key to the host computer. The next time the base encounters the same key in the pressed state, it can query its own memory (cache) 208 instead of retrieving the same scan code from the key memory again.

An advantage to the input data caching is that the query caching is typically much faster than retrieving data from the key. By caching the input data from input members, the base can maintain the flexible and powerful capability of input member data delivery, and maintain the quicker response times of keeping the data in local memory. The example described above could, of course, be applied to caching the input data for any input member. Furthermore, the base and/or host computer could store the cached data in static memory, so that the cached data would not need to updated even if the base was turned off.

Figure 17:
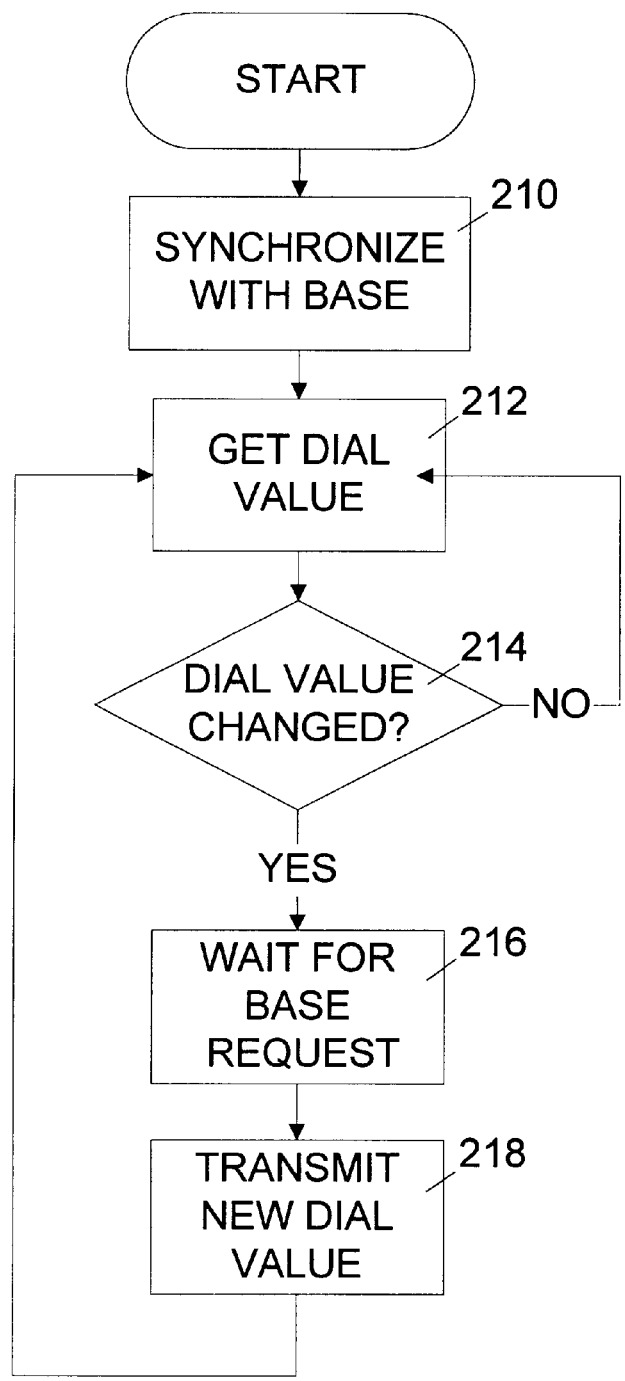
FIG. 17 represents a flow diagram that illustrates an embodiment of a process for transmission of change in status of an input member.

FIG. 17 represents a flowchart that illustrates an embodiment of an operational mode of the present invention wherein input members only transmit data to the base when there has been a change in their status. Instead of requiring the base to poll each input member, the input members may monitor themselves, and only send data to the base when their state has changed. This process can reduce the data traffic across the communication surface and can increase response time of the input devices.

The flowchart shown in FIG. 17 illustrates an embodiment of a self-monitoring process for a dial type input member. In this embodiment, a dial may maintain a counter value that is representational of its rotational state. This counter value may be synchronized with the base 210, so that the base is aware of the initial dial rotational state. Once the rotational state is synchronized, the dial may monitor the rotational state of the dial by acquiring the current counter value 212 and comparing it with a previous known counter value 214. The dial may continue to monitor the counter value until a difference is detected, signaling a change in the rotational state. If the dial detects a change, it may wait for the base to transmit a request for status changes 216. The dial may then transmit its new rotational state to the base 218. In this embodiment, the base may generate status change requests periodically. As shown in the flowchart, according to this embodiment, unless the dial detects a change in its rotational state, it may ignore these status change requests from the base. By allowing individual input members to monitor user input, the present invention can reduce the processing complexity of the base. Furthermore, unnecessary and/or redundant communication between the base and the individual input members may be reduced dramatically; only "new" information about the input member status may be sent from each input member to the base. Of course, the process described in FIG. 17 may apply to any input member, not just a dial.

Figure 18:
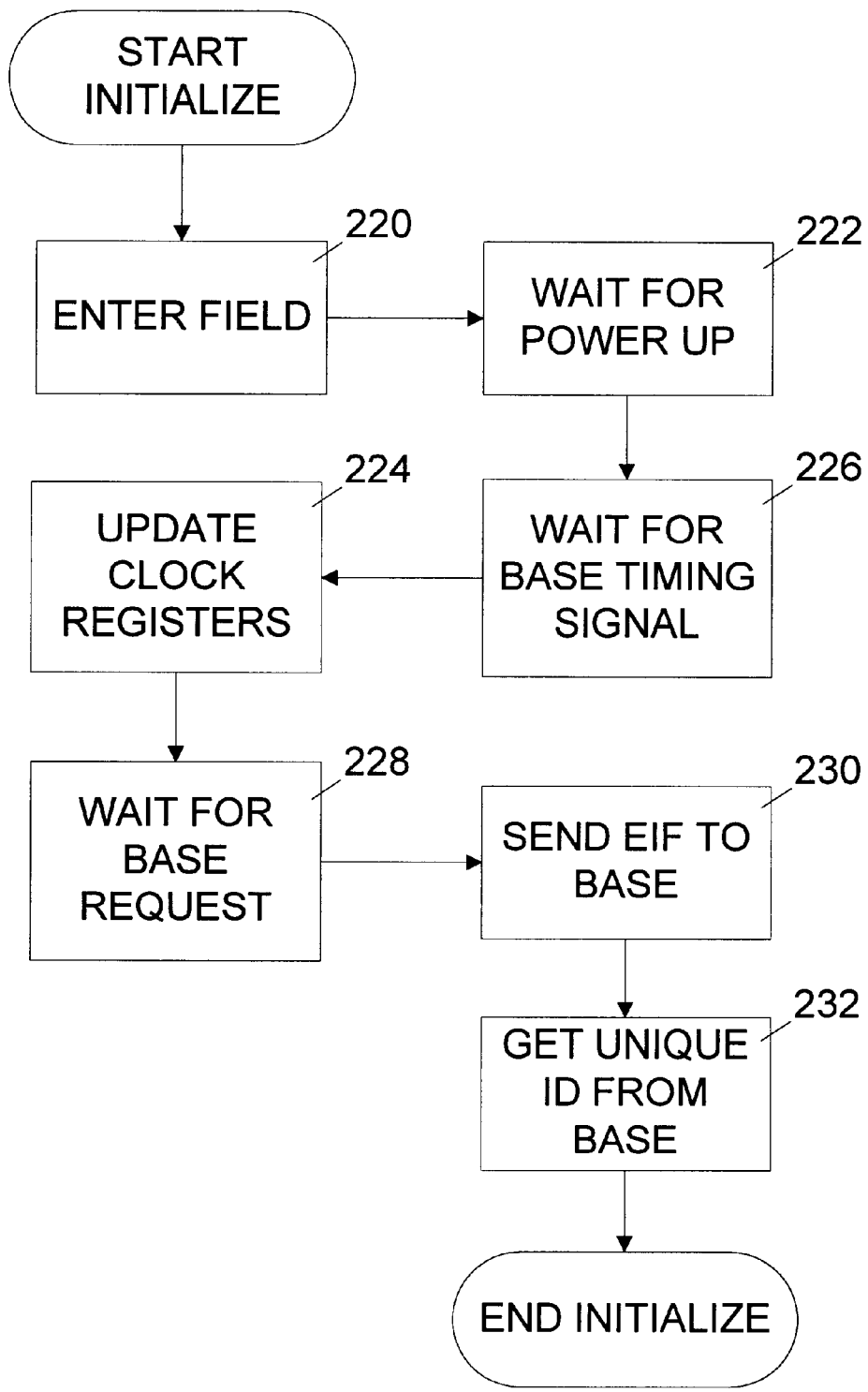
FIG. 18 represents a flow diagram that illustrates an embodiment of a process for entry into field initialization and timing calibration of an input member.

FIG. 18 represents a flowchart that illustrates another embodiment of an operational mode according to the present invention. This embodiment includes a clock synchronization algorithm that allows use of input members that include processors such as the MSP430 series to calibrate their internal clocks so that they may communicate with the base at the appropriate modulation frequency. This embodiment can avoids the need to use more expensive oscillators, such as crystals, in circuits for non-key input members. This embodiment may also allow the input members to adjust their internal clocks in response to deviations that may result from, among other things, manufacturing variability, changes in operating temperature, and/or antenna voltage differences.

As shown in FIG. 18, a user may place an input member into the communication area of the base 220. For input members that receive power from the base carrier signal, entering the field may create a transition from an unpowered state when the input member is arranged outside the field to a powered state when the input member is arranged inside the field. During this transition, the input member may wait until it is fully powered 222. Once powered, the input member may begin performing initialization tasks.

One initialization task shown in the flowchart is to calibrate the internal clock in the input member microprocessor to tune the communication modulation frequencies for optimal performance. According to one embodiment, clock calibration can occur in two steps. First, the input member may utilized an internal counter to measure the interval between two or more timing signals transmitted at known intervals by the base 226. The internal counter may be driven by the internal clock being calibrated. Discrepancies between the known and measured interval timing may be utilized to calibrate the internal clock through provided clock adjustment registers 224. Of course, the present embodiment can provide for clock calibration of input members at times other than immediately after the input member enters the field.

The embodiment shown in FIG. 18 also includes an "entry into field" process. According to this process, when an input member is introduced to the RF field, it will initialize itself, transmit its functional capabilities, and synchronize its state with the base. This is important to prevent unintended behavior from an input member operatively positioned in the vicinity of the base in an unknown condition, and generating spurious input data.

In the embodiment shown in FIG. 18, once clock calibration is completed, the input member may wait for a base request for communication with newly powered input members 228. According to this embodiment, this base request may occur periodically to identify any input members that have not completed an initiation cycle since powering up. Once the input member detects this base request, it may transmit to the base an Entry Into Field (EIF) report 230. The EIF report sent by the input device may contain data specifying the input capabilities of the input member, as well as the initial settings of any internal states, such as the rotational state for dials, described above. The EIF report may be used to provide detailed information to the base about the input member and its functions.

Once the base has processed the EIF report, it may transmit an unique identifier for the input member 232. This unique identifier (ID) may be dynamically assigned. Depending on the circumstances, the base may provide different IDs to each of two identical input members, to allow them to provide separate functionality. Alternately, the base may assign a different ID to the same input member during consecutive power up cycles. The flexibility of the dynamic ID can permit the base to assign and reassign unique identifiers to each of the input members as needed. The dynamic ID can also allow input members to be manufactured without the requirement for individual input members needing an ID before delivery to a user. Of course, the present invention will also operate with input members that contain fixed unique identifiers, or unique identifiers assigned during the manufacturing process. The above initialization process is merely representational of the capabilities for clock calibration, input member state synchronization, and unique ID assignment. Those of ordinary skill in the art could substitute other processes that could implement these capabilities.

Figure 19:
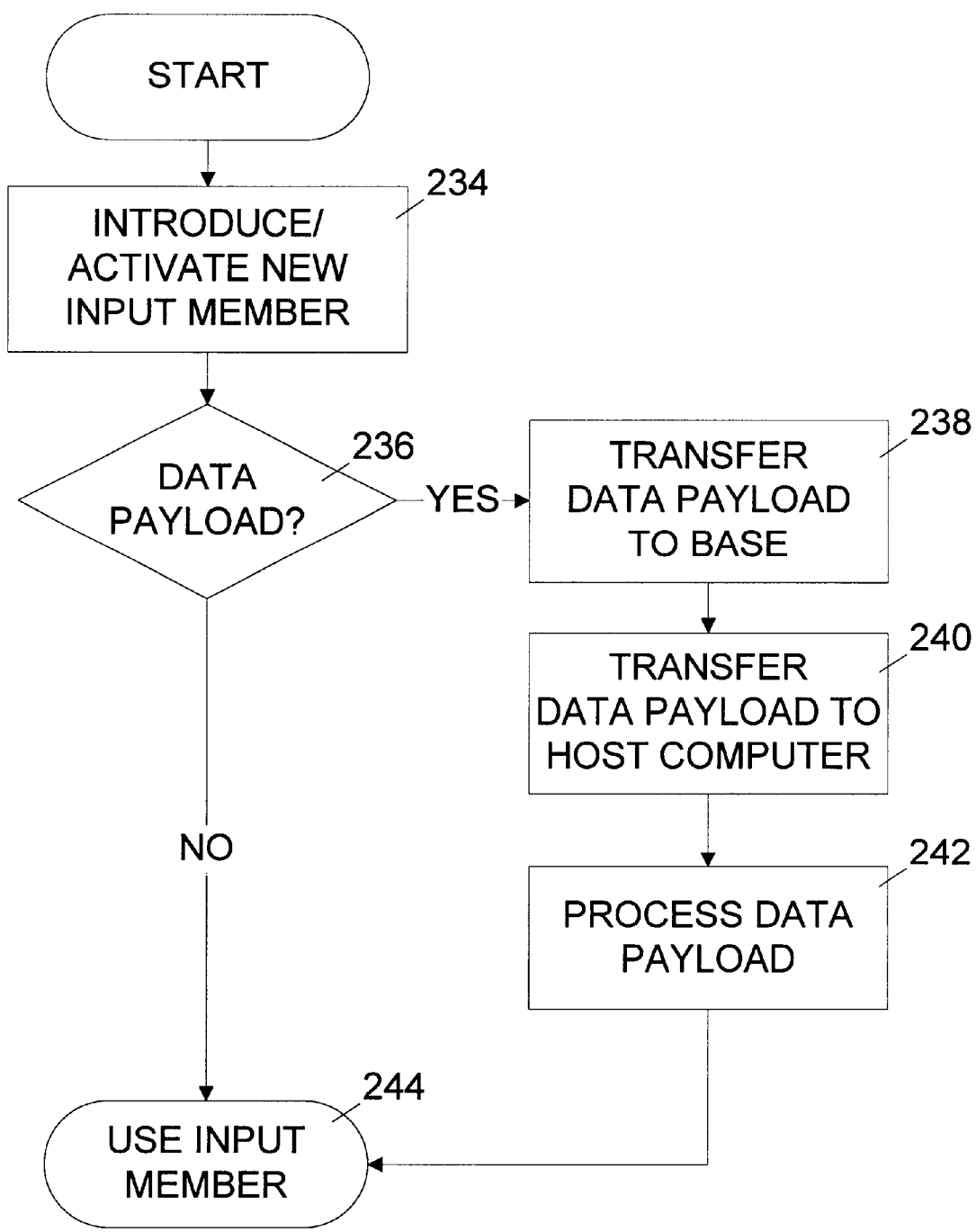
FIG. 19 represents a flow diagram that illustrates an embodiment of data payload delivery from an input member to a host computer.

FIG. 19 represents a flowchart that illustrates an embodiment of a process by which input members may deliver a data payload to a host computer. This feature may, for example, allow input members to be delivered to a user and have the input member provide a new software function to an existing application, without any other steps from the user. This capability represents a dramatic advance over how software features are presently delivered. For example, a user could have a graphic editing application already on his or her computer. The user could obtain a dial designed to operate with this application. To operate the newly obtained dial, the user may merely place it in operative proximity to the base. Using the data payload delivery capability, the dial could transmit data such as scripts, plug-ins, or executable code through the base to the graphic editing application. In essence, the newly introduced dial may "teach" additional features to an existing application by delivering a data payload to the host computer.

FIG. 19 represents a flowchart that illustrates an embodiment of a simplified data payload delivery process. This embodiment may begin with the user introducing and/or activating a new input member into the communication area of the base 234. Once detected by the base, the new input member may transmit the status of its data payload 236. If the input member has a data payload to deliver, it may be transferred from the input member memory to the base 238. From there, the data payload may be transferred to the host computer 240 and then processes at the appropriate application or destination 242. Once the data payload is delivered, or if there is not data payload, the base may use the input member in a normal fashion 244. Depending on the need for the particular embodiment, the data payload may be delivered in various manners. For example, the data payload may be delivered each time the input member is introduced or activated in the vicinity of the base. Alternately, the data payload may be delivered once or a fixed number of times and then cleared from internal memory.

Of course, the above description provides a broad outline of this capability. The present invention can greatly simplify human/computer interactions by allowing individual input members to deliver information payloads to the base and/or host computer. These information payloads can include, among other things, executable code, scripts, plug-ins, stand-alone programs, and/or application features. Providing a means for input members to expand the capability of the base and/or host computer through information payload delivery may eliminate the need for users to use CDs or floppy disks to install new software or additional application features.

The advantages of the present invention become apparent when examining the drawbacks of known input devices. For example, video-editing control panels are frequently used to manipulate and edit digital video. A typical video-editing control panel may contain a jog shuttle wheel for navigating the video content and some assigned buttons to initiate various editing commands. However, the fixed layout of the input mechanisms for a typical control panel invariably compromises the user experience in exchange for manufacturing convenience.

A novice user, for example, may want only a few buttons and a jog-shuttle wheel to perform basic editing functions. An advanced user may prefer more buttons as well as some sliders and an A/B fader mechanism. Furthermore, both the novice and advanced users may wish to position or reposition their desired controls in a manner not anticipated by manufacturers of known input devices. This example demonstrates difficulties that can be encountered using known computer input device technology to develop a single control panel that can meet the needs of all users.

U.S. patent application Ser. No. 09/524,011 to Scott M. Rix filed Mar. 13, 2000, the entire contents of the disclosure of which is hereby incorporated by reference, discloses a novel computer input device that permits an individual user to individually position and assign a function to tactile mechanisms for customized computer input.

We claim:

1. A configurable computer input device, comprising:
    a base operable to generate and detect a radio frequency carrier signal; and
    a plurality of independently positionable input members each operatively positioned in the vicinity of the base and individually operable to modulate the carrier signal responsive to its identity and status, wherein at least one of the input members is operative to communicate to the base upon a change in its status.

2. The computer input device according to claim 1, wherein input members modulate the carrier signal through inductive backscattering.

3. The computer input device according to claim 1, wherein at least one computer input function is assignable to activation of at least one of the input members.

4. The computer input device according to claim 1, wherein at least one of the input members is positionable in an infinite number of positions on the base.

5. The computer input device according to claim 1, wherein the base comprises memory operable to store an input function assigned to activation of the input member.

6. The computer input device according to claim 1, wherein an input function assigned to activation of at least one of the input members is stored in the host computer.

7. The computer input device according to claim 1, wherein at least one of the input members comprises a coil, an RFID chip, and a switch circuit connecting the coil and the RFID chip.

8. The computer input device according to claim 1, wherein at least one of the input members comprises a tuning capacitor.

9. The computer input device according to claim 1, wherein the base is operable to selectively interrogate the input members.

10. The computer input device according to claim 1, wherein the base is operable to selectively ignore communications of status by the input members.

11. The computer input device according to claim 1, wherein at least one of the input members is operable to only transmit its status in response to interrogation by the base.

12. The computer input device according to claim 1, further comprising:
    a wired or wireless connection for communication with a host computer.

13. The computer input device according to claim 1, wherein a status of at least one of the input members is initialized upon being operatively positioned in the vicinity of the base.

14. The computer input device according to claim 1, wherein at least one of the input devices is independently repositionable.

15. The computer input device according to claim 1, wherein at least one of the input members is independently removably attachable to the base.

16. The computer input device according to claim 1, wherein the base comprises at least one antenna operable to transmit and receive the carrier signal.

17. The computer input device according to claim 1, wherein the base is arranged on a keyboard housing.

18. The computer input device according to claim 1, wherein at least one of the input members is removably positionable in an infinite number of locations on the base.

19. The computer input device according to claim 1, wherein the input members are selected from the group comprising keys, buttons, button pads, key pads, thumb pads, joysticks, sliders, dials, trackpads and jog/shuttle wheels.

20. The computer input device according to claim 1, wherein at least one of the input members is inductively powered by the carrier signal.

21. The computer input device according to claim 1, wherein at least one the input members is powered by a power source included in each input member.

22. The computer input device according to claim 1, wherein the base is operable to record computer input functions to be assigned to activation of the input members.

23. The computer input device according to claim 1, wherein the base is operable to launch a configuration program on a host computer.

24. The computer input device according to claim 1, wherein the at least one input members is independently positionable in a plurality of discrete positions.

25. The computer input device according to claim 1, wherein the base is operatively connectable to a host computer.

26. The computer input device according to claim 1, wherein at least one of the input members comprises memory operable to store an input function assigned to activation of the input member.

27. The computer input device according to claim 26, wherein the input member memory stores at least one of strings of characters, macro sequences, executable programs, scripts, application plug-ins, user identity data, passwords, advertising information, electronic images, and a scan code that corresponds to an input function.

28. The computer input device according to claim 1, wherein at least one of the input members comprises at least one antenna operable to receive power and carry out base-to-input member and input member-to-base communication.

29. The computer input device according to claim 28, wherein at least one of the input members comprises a first antenna operable to receive power, a second antenna operable to carry out base-to-input member communication and a third antenna operable to carry out input member-to-base communication.

30. The computer input device according to claim 1, wherein at least one of the input members comprises a tuned coil operative to receive power and communicate with the base.

31. The computer input device according to claim 30, wherein inductance and capacitance of a circuit comprising the coil produces a naturally resonant circuit.

32. The computer input device according to claim 1, wherein the input members are simultaneously operable and the base is operable to prioritize modulations of the carrier signal by the input members.

33. The computer input device according to claim 32, wherein the base comprises a multiple object, multiple-protocol anticollision algorithm.

34. The computer input device according to claim 1, wherein at least one of the input members comprises an electromechanical element, a coil, and a microprocessor connected to the electromechanical element and the coil.

35. The computer input device according to claim 34, wherein electromechanical element comprises output members connected to digital input pins of the microprocessor.

36. The computer input device according to claim 34, wherein at least one of the input members comprises an analog input member, a microprocessor and an analog to digital converter means.

37. The computer input device according to claim 1, wherein the base comprises a cover on which the input members are each independently positionable.

38. The computer input device according to claim 37, wherein at least one of the input members is independently positionable in an infinite number of locations on the cover.

39. The computer input device according to claim 37, wherein the cover is removable.

40. The computer input device according to claim 37, wherein at least one of the cover and the base comprises at least one attachment element operable to removably secure the cover to the base.

41. The computer input device according to claim 37, wherein at least one of the input members is attached to the cover with a reusable adhesive.

42. The computer input device according to claim 37, wherein at least one of the input members is independently removably attachable to the cover.

43. The computer input device according to claim 37, wherein the cover comprises a template operable to indicate at least one of positions and functions for the input members.

44. The computer input device according to claim 37, further comprising:
 a template operable to indicate at least one of positions and functions for the input members.

45. The computer input device according to claim 44, wherein at lease one of the cover and the template comprises an RFID circuit.

46. The computer input device according to claim 44, wherein at least one of the base and the template is operable to modulate the carrier signal.

47. A configurable computer input device, comprising:
 a base operable to generate and detect a radio frequency carrier signal; and
 a plurality of independently positionable input members each operatively positioned in the vicinity of the base and individually operable to modulate the carrier signal responsive to its identity and status,
 wherein the input members are simultaneously operable and the base is operable to prioritize modulations of the carrier signal by the input members.

48. A configurable computer input device, comprising:
 a base operable to generate and detect a radio frequency carrier signal; and
 a plurality of independently positionable input members each operatively positioned in the vicinity of the base and individually operable to modulate the carrier signal responsive to its identity and status,
 wherein the base is operative to selectively ignore communications of status by the input members.

* * * * *